United States Patent
Partaker et al.

(10) Patent No.: US 9,584,563 B2
(45) Date of Patent: Feb. 28, 2017

(54) COMMUNICATION SYSTEM AND METHOD FOR CONTENT ACCESS

(75) Inventors: Eric Partaker, London (GB); Richard Cole, London (GB); Natasha Sopieva, Hertfordshire (GB)

(73) Assignee: Skype, Dublin (IE)

( * ) Notice: Subject to any disclaimer, the term of this patent is extended or adjusted under 35 U.S.C. 154(b) by 712 days.

(21) Appl. No.: 12/005,057

(22) Filed: Dec. 21, 2007

(65) Prior Publication Data

US 2009/0013059 A1 Jan. 8, 2009

(30) Foreign Application Priority Data

Jul. 3, 2007 (GB) .................................. 0712878.8

(51) Int. Cl.
*G06F 15/16* (2006.01)
*H04L 29/06* (2006.01)
(Continued)

(52) U.S. Cl.
CPC .... *H04L 65/1096* (2013.01); *H04M 3/42076* (2013.01); *H04L 29/12122* (2013.01); *H04L 61/1547* (2013.01); *H04L 65/1069* (2013.01)

(58) Field of Classification Search
CPC ............... H04L 65/1096; H04L 65/403; H04L 2012/2841; H04L 65/103; H04L 51/32
(Continued)

(56) References Cited

U.S. PATENT DOCUMENTS 6,941,345 B1 9/2005 Kapil et al.
7,200,636 B2 4/2007 Harding
(Continued)

FOREIGN PATENT DOCUMENTS

DE 10 2005 036424 B3 1/2005
DE 10 2005 036424 B3 11/2006
(Continued)

OTHER PUBLICATIONS

Notification of Transmittal of the International Search Report and the Written Opinion of the International Searching Authority, or the Declaration, dated Mar. 4, 2009, from counterpart International Application No. PCT/EP2008/053721.
(Continued)

*Primary Examiner* — Djenane Bayard
(74) *Attorney, Agent, or Firm* — Tom Wong; Micky Minhas

(57) ABSTRACT

A method of accessing content at a user terminal connected to a communication network and executing a communication client includes the client displaying a list of contacts associated with a user of the client and the client retrieving a message from the communication network. The message is related to a further user represented by one of the contacts displayed in the list of contacts, and includes a reference to content stored in a storage means accessible by the communication network. The client initiates a call to the further user over the communication network responsive to a user of the client selecting the one of the contacts in the list of contacts. Responsive to initiating the call, the client establishes communication with the storage means using the reference, accesses the content and displays the content at the user terminal.

35 Claims, 21 Drawing Sheets

(51) Int. Cl.
*H04M 3/42* (2006.01)
*H04L 29/12* (2006.01)

(58) Field of Classification Search
USPC .................. 709/206, 213, 217, 218, 219
See application file for complete search history.

(56) References Cited

U.S. PATENT DOCUMENTS

| | | | |
|---|---|---|---|
| 7,475,112 B2 | 1/2009 | Sinclair et al. | |
| 7,995,728 B1 * | 8/2011 | Martin et al. | 379/201.02 |
| 8,209,385 B2 | 6/2012 | Partaker | |
| 8,295,865 B1 * | 10/2012 | Kirchhoff et al. | 455/466 |
| 2002/0067812 A1 | 6/2002 | Fellingham et al. | |
| 2002/0176404 A1 | 11/2002 | Girard | |
| 2003/0154446 A1 | 8/2003 | Constant et al. | |
| 2003/0222907 A1 | 12/2003 | Heikes et al. | |
| 2003/0225848 A1 | 12/2003 | Heikes et al. | |
| 2004/0088357 A1 | 5/2004 | Harding | |
| 2005/0055627 A1 | 3/2005 | Lloyd et al. | |
| 2005/0207379 A1 | 9/2005 | Shen et al. | |
| 2005/0220064 A1 | 10/2005 | Hundscheidt et al. | |
| 2006/0059236 A1 * | 3/2006 | Sheppard et al. | 709/206 |
| 2006/0168015 A1 | 7/2006 | Fowler | |
| 2006/0294195 A1 | 12/2006 | Hyatt | |
| 2007/0143414 A1 | 6/2007 | Daigle | |
| 2007/0287477 A1 * | 12/2007 | Tran | H04L 29/06027 455/466 |
| 2008/0021957 A1 * | 1/2008 | Medved | G06Q 30/02 709/203 |
| 2008/0043942 A1 | 2/2008 | Cardona et al. | |
| 2008/0065735 A1 * | 3/2008 | Szeto | G06Q 30/06 709/206 |
| 2008/0086531 A1 | 4/2008 | Chavda et al. | |
| 2008/0162649 A1 | 7/2008 | Lee et al. | |
| 2008/0256298 A1 * | 10/2008 | Lu et al. | 711/124 |
| 2008/0313056 A1 * | 12/2008 | Nowak et al. | 705/27 |
| 2008/0316999 A1 * | 12/2008 | Qiu et al. | 370/352 |
| 2009/0013048 A1 | 1/2009 | Partaker et al. | |
| 2009/0013059 A1 | 1/2009 | Partaker et al. | |
| 2009/0161853 A1 * | 6/2009 | Ku et al. | 379/207.16 |
| 2009/0190738 A1 * | 7/2009 | Guedalia et al. | 379/211.02 |
| 2009/0210524 A1 * | 8/2009 | McCormack et al. | 709/223 |
| 2010/0098235 A1 * | 4/2010 | Cadiz et al. | 379/211.02 |
| 2013/0283375 A1 * | 10/2013 | Kuo | G06F 17/3089 726/22 |

FOREIGN PATENT DOCUMENTS

| | | |
|---|---|---|
| WO | WO 03/056732 A1 | 7/2003 |
| WO | WO 2004/049182 A1 | 6/2004 |
| WO | WO 2005/009019 A2 | 1/2005 |
| WO | WO-2009003733 | 1/2009 |
| WO | WO-2009003734 | 1/2009 |

OTHER PUBLICATIONS

International Search Report and Written Opinion PCT/EP2008/053720, mailed Jul. 31, 2008.
Office Action, U.S. Appl. No. 12/004,092, dated May 11, 2010.
Office Action, U.S. Appl. No. 12/004,092, dated Oct. 30, 2009.
Office Action, U.S. Appl. No. 12/004,092, dated Aug. 2, 2011.
Final Office Action, U.S. Appl. No. 12/004,092, dated Nov. 8, 2010.
"Notice of Allowance", U.S. Appl. No. 12/004,092, (Feb. 28, 2012), 15 pages.
Partaker, Eric et al., "Multimedia Mood Messages", UK Application 0712877.0, (Jul. 3, 2007), 52 pages.

* cited by examiner

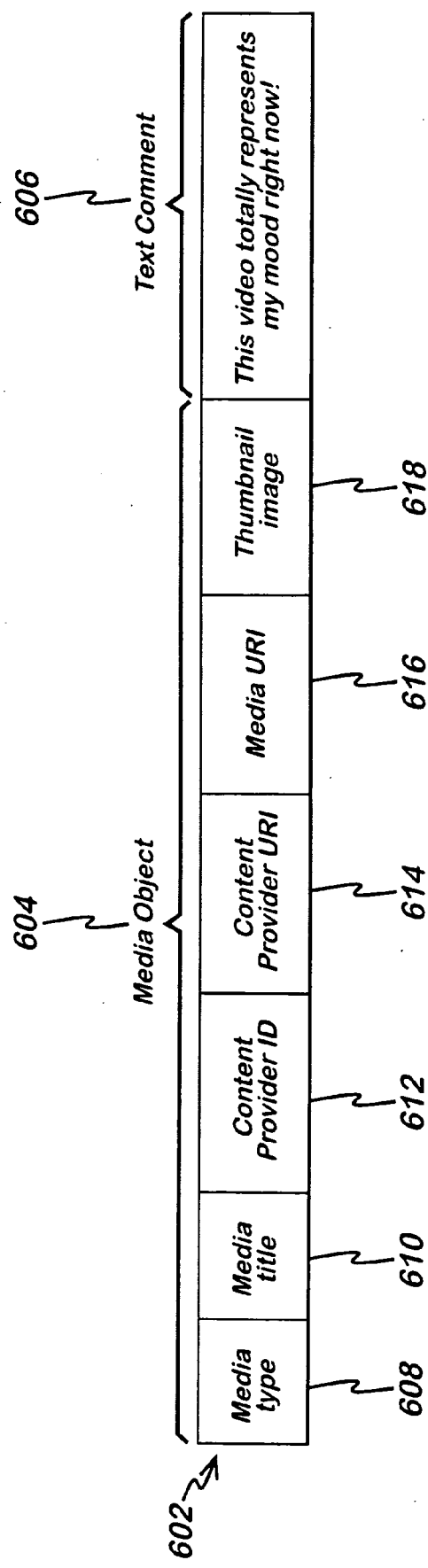
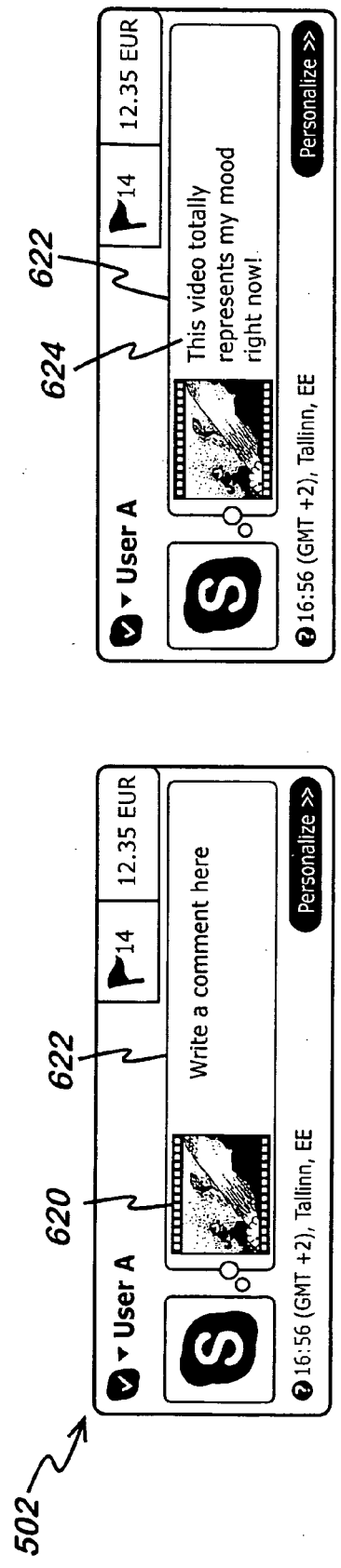

COMMUNICATION SYSTEM AND METHOD FOR CONTENT ACCESS

RELATED APPLICATION

This application claims priority under 35 U.S.C. §119 or 365 to Great Britain, Application No. 0712878.8, filed Jul. 3, 2007. The entire teachings of the above application are incorporated herein by reference.

TECHNICAL FIELD

This invention relates to a communication system and method.

BACKGROUND

Voice over internet protocol ("VoIP") communication systems allow the user of a device, such as a personal computer, to make calls across a computer network such as the Internet. These systems are beneficial to the user as they are often of significantly lower cost than fixed line or mobile networks. This may particularly be the case for long distance calls. To use VoIP, the user must install and execute client software on their device. The client software provides the VoIP connections as well as other functions such as registration and authentication. In addition to voice communication, the client may also provide video calling and instant messaging ("IM").

One type of VoIP communication system uses a peer-to-peer ("P2P") topology built on proprietary protocols. To access the peer-to-peer system, the user must execute P2P client software provided by a P2P software provider on their PC, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

One of the advantages of VoIP communication systems, compared to the public switched telephone network ("PSTN"), is that supplementary information can be provided about the users of the VoIP communication system. This supplementary information can take the form of presence information and a "mood message".

Presence information is an indication of the current status of a user of the system. More specifically, presence information is displayed in the user interface of the client for each of the contacts that the user has stored, and allows the user to view a best guess regarding the current status of the contacts in the system. Example presence states that may be displayed include "online", "offline", "away", "not available" and "do not disturb". The use of presence states provides a user with a best guess regarding the current status of a contact before attempting to communicate with the contact. For example, if the user is not online, and therefore unable to be contacted, then this is indicated to the user before attempting to make a call. Similarly, if a contact is busy and unlikely to answer, then this may also be communicated in advance via the presence state. This is a considerable advantage over PSTN systems, which do not provide any prior information on the probable state of a user. The only option in PSTN systems is to dial a number and wait and see if it is answered.

Mood messages are short text strings that are composed by the users to distribute information about themselves to their contacts and supplement their presence status. The mood message of a contact is generally displayed next to the contact's name and presence status in the client. Mood messages are useful for a number of reasons. For example, a mood message can be used to give more information or a reason for a particular presence status, e.g. if a user is offline, the mood message may say "On holiday", thereby explaining why the user is offline. Similarly, if a user's presence state is set to "do not disturb", the mood message may say "Busy working. Only contact me if urgent". Mood messages are also useful for users that travel frequently, as a VoIP system can be accessed from anywhere in the world, but this is not reflected in the presence states. Therefore, it is useful for a user to show a mood message such as "In London" next to their presence state.

One popular use for mood messages is to utilise the mood message as a means to easily share links to multimedia content on the internet. For example, users can include a hyperlink to a particular webpage that has some interesting multimedia content (such as a video, picture or audio recording) in the mood message, so that all the user's contacts can see the hyperlink and click on the hyperlink to visit the webpage.

SUMMARY

The multimedia content at the website linked in the mood message can serve to stimulate conversation over the VoIP communication system. However, this relies on the contacts of the user with the mood message actually clicking on the hyperlink and viewing the webpage. This can be a problem, as a mere hyperlink does not generally encourage other users to view the media.

There is therefore a need for a technique to address the aforementioned problems and provide for the efficient sharing and display of multimedia content by the users.

According to one aspect of the present invention there is provided a method of accessing content at a user terminal connected to a communication network and executing a communication client, comprising: said client displaying a list of contacts associated with a user of said client; said client retrieving a message from said communication network, wherein said message is related to a further user represented by one of said contacts displayed in said list of contacts, said message comprising a reference to content stored in a storage means accessible by said communication network; said client initiating a call to said further user over the communication network responsive to a user of said client selecting said one of said contacts in said list of contacts; and responsive to initiating said call, said client establishing communication with said storage means using said reference, accessing the content and displaying the content at said user terminal.

In one embodiment, said content is a video. In another embodiment, said content is an audio recording.

Preferably, the method further comprises the step of said client muting said content responsive to said further user answering said call. Preferably, the method further comprises the step of downloading the list of contacts from a network element. Preferably, said step of retrieving the message comprises communicating with a further client executed at a user terminal of the further user. Preferably, said message is a mood message created by said further user.

Preferably, said step of displaying the content at said user terminal comprises said client executing media player means at said user terminal, wherein said content is displayed to said user using said media player means. Preferably, said media player means is embedded within said client. Preferably, said media player means comprises user-operable controls for controlling playback and setting audio properties of said content.

Preferably, the method further comprises the step of ascertaining whether said reference to said content is listed in a database prior to displaying said content. Preferably, if said reference to said content is listed in said database, said user terminal does not display said content. Preferably, said reference is a network address of said content. Preferably, said network address is a uniform resource identifier.

Preferably, said communication network is a packet based communication network. In one embodiment, said client is a voice over internet protocol communication client. Preferably, said voice over internet protocol communication client is a peer-to-peer communication client. In another embodiment, said client is an instant messaging communication client.

In one embodiment, said user terminal is a personal computer. In another embodiment, said user terminal is a mobile device.

According to another aspect of the present invention there is provided a computer program product comprising program code means which when executed by a computer implement the steps according to the above-defined method of accessing content at a user terminal.

According to another aspect of the present invention there is provided a method of accessing content at a user terminal connected to a communication network and executing a communication client, comprising: said client displaying a list of contacts associated with a user of said client; said client retrieving a message from said communication network, wherein said message is related to a further user represented by one of said contacts displayed in said list of contacts, said message comprising a reference to content stored in a storage means accessible by said communication network; said client receiving a communication request initiated by said further user over the communication network; and responsive to receiving said communication request, said client establishing communication with said storage means using said reference, accessing the content and displaying the content at said user terminal.

Preferably, said communication request is an incoming call.

According to another aspect of the present invention there is provided a computer program product comprising program code means which when executed by a computer implement the steps according to the above-defined method of accessing content at a user terminal.

According to another aspect of the present invention there is provided a user terminal comprising: communication means for communicating with a communication network; display means; and processing means arranged to execute a communication client, wherein said client is configured to: display a list of contacts associated with a user of said client on said display means; retrieve a message from said communication network, wherein said message is related to a further user represented by one of said contacts displayed in said list of contacts, said message comprising a reference to content stored in a storage means accessible by said communication network; initiate a call to said further user over the communication network responsive to a user of said client selecting said one of said contacts in said list of contacts; and, responsive to initiating said call, establish communication with said storage means using said reference, access the content and display the content on said display means.

According to another aspect of the present invention there is provided a user terminal comprising: communication means for communicating with a communication network; display means; and processing means arranged to execute a communication client, wherein said client is configured to: display a list of contacts associated with a user of said client on said display means; retrieve a message from said communication network, wherein said message is related to a further user represented by one of said contacts displayed in said list of contacts, said message comprising a reference to content stored in a storage means accessible by said communication network; receive a communication request initiated by said further user over the communication network; and, responsive to receiving said communication request, establish communication with said storage means using said reference, access the content and display the content at said user terminal.

BRIEF DESCRIPTION OF THE DRAWINGS

For a better understanding of the present invention and to show how the same may be put into effect, reference will now be made, by way of example, to the following drawings in which:

FIG. 6A shows multimedia mood message data;

FIGS. 6B and 6C shows a user interface containing a multimedia mood message;

DETAILED DESCRIPTION

Figure 1:
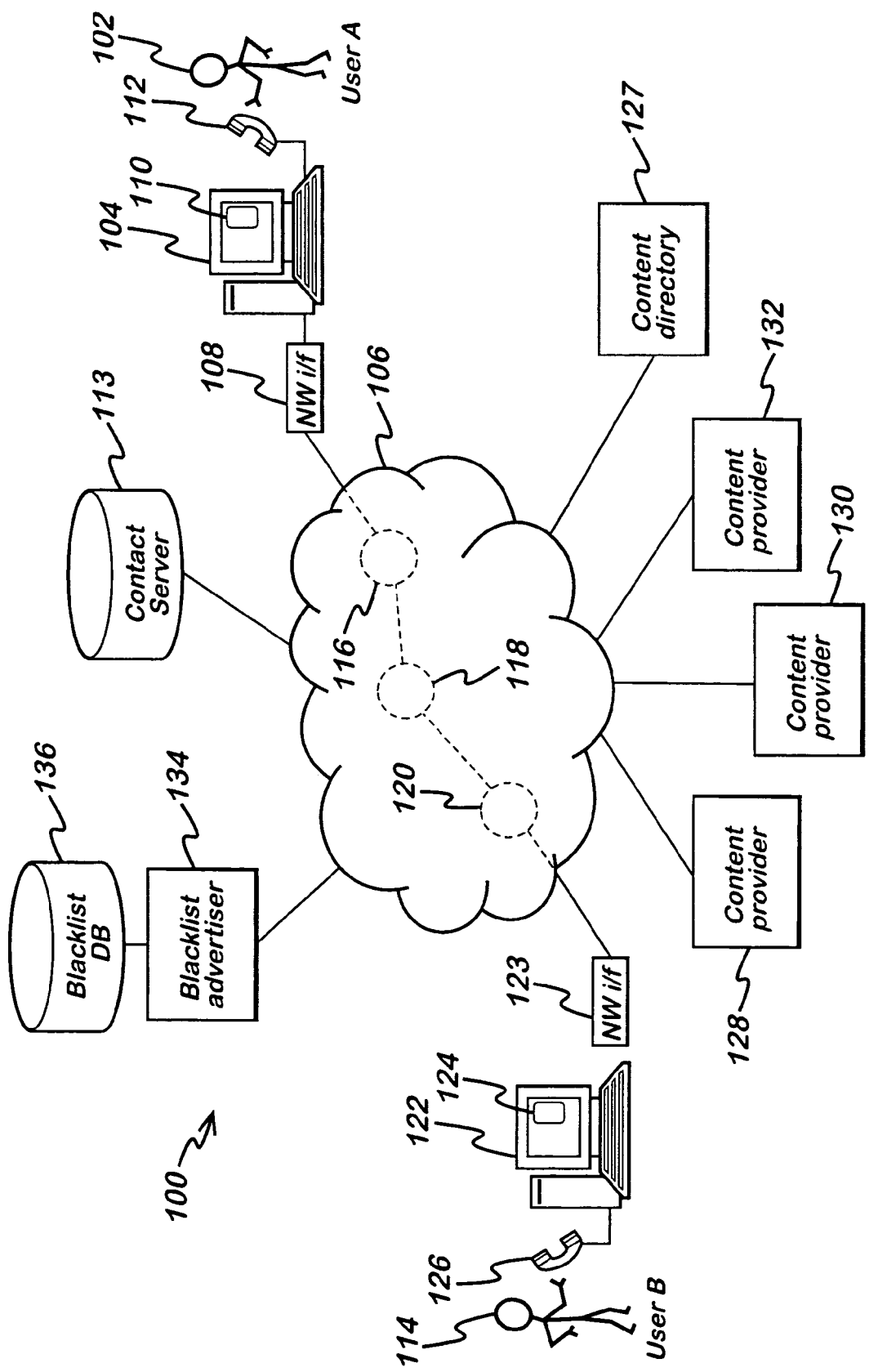
FIG. 1 shows a P2P communication system.

Reference is first made to FIG. 1, which illustrates a P2P communication system 100. Note that whilst this illustrative embodiment is described with reference to a P2P communication system, other types of communication system could also be used, such as instant messaging systems and other, non-P2P, VoIP systems. A first user of the P2P communication system (denoted "User A" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user device is arranged to receive information from and output information to a user of the device. In a preferred embodiment of the invention the user device comprises a display such as a screen and a keyboard and mouse. The user device 104 is connected to the network 106 via a network interface 108 such as a modem, and the connection between the user terminal 104 and the network interface 108 may be via a cable (wired) connection or a wireless connection.

The user terminal 104 is running a client 110, provided by the P2P software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a handset, but can be in the form of a headphone or earphone with an integrated microphone, or as a separate loudspeaker and microphone independently connected to the user terminal 104.

Figure 2:
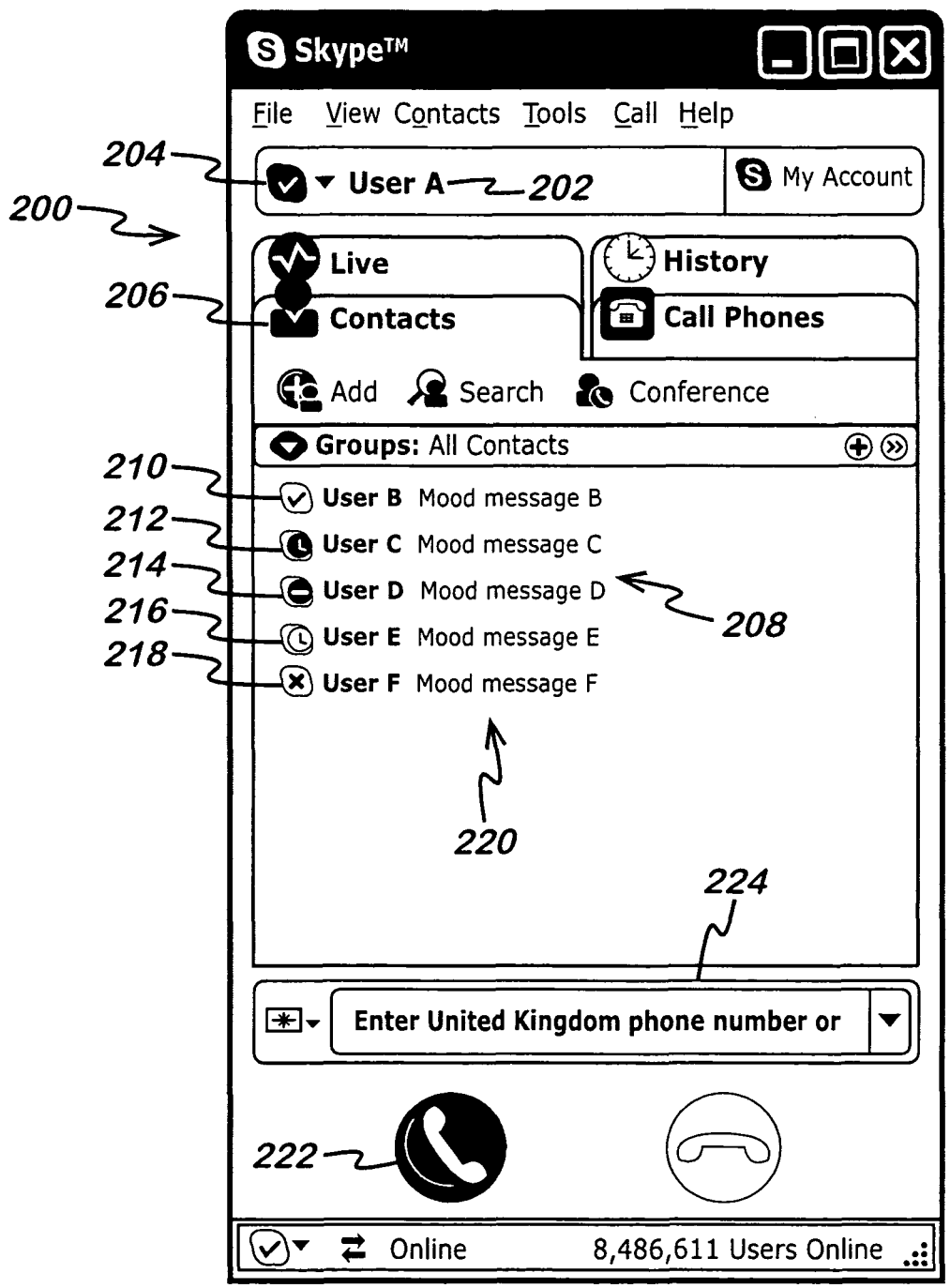
FIG. 2 shows a user interface of a client executed on a user terminal.

An example of a user interface 200 of the client 110 executed on the user terminal 104 of User A 102 is shown illustrated in FIG. 2. The client user interface 200 displays the username 202 of User A 102 in the P2P system, and User A can set his own presence state (that will be seen by other users) using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the P2P system (User B to F) are shown listed in contact list 208. Each of these contacts have authorised the user of the client 110 to view their contact details and online presence and mood message information. Each contact in the contact list has a presence status icon associated with it. For example, the presence status icon for User B 210 indicates that User B is "online", the presence icon for User C 212 indicates that User C is "not available", the presence icon for User D 214 indicates that User D's state is "do not disturb", the presence icon for User E 216 indicates User E is "away", and the presence icon for User F 218 indicates that User F is "offline". Further presence indications can also be included. Next to the names of the contacts in pane 208 are the mood messages 220 of the contacts.

The contact list for the users (e.g. the contact list 208 for User A) is stored in a contact server 113 shown in FIG. 1. When the client 110 first logs into the P2P system the contact server 113 is contacted, and the contact list is downloaded to the user terminal 104. This allows the user to log into the P2P system from any terminal and still access the same contact list. The contact server is also used to store the user's own mood message (e.g. the mood message of User A 102) and a picture selected to represent the user (known as an avatar). This information can be downloaded to the client 110, and allows this information to consistent for the user when logging on from different terminals. The client 110 also periodically communicates with the contact server 113 in order to obtain any changes to the information on the contacts in the contact list, or to update the stored contact list with any new contacts that have been added. Presence information is not stored centrally in the contact server. Rather, the client 110 periodically requests the presence information for each of the contacts in the contact list 208 directly over the P2P system. Similarly, the current mood message for each of the contacts, as well as a picture (avatar) that has been chosen to represent the contact, are also retrieved by the client 110 directly from the clients of each of the contacts over the P2P system.

Calls to the P2P users in the contact list may be initiated over the P2P system by selecting the contact and clicking on a "call" button 222 using a pointing device such as a mouse. Alternatively, the call may be initiated by typing in the P2P identity of a contact in the field 224. Referring again to FIG. 1, the call set-up is performed using proprietary protocols, and the route over the Internet 106 between the calling user and called user is determined by the peer-to-peer system without the use of servers. In FIG. 1, an illustrative route is shown between the caller User A (102) and the called party, User B (114), via other peers (116, 118, 120) of the P2P system. It will be understood that this route is merely an example, and that the call may be routed via fewer or more peers.

Following authentication through the presentation of digital certificates (to prove that the users are genuine subscribers of the P2P system—described in more detail in WO 2005/009019), the call can be made using VoIP. The client 110 performs the encoding and decoding of VoIP packets. VoIP packets from the user terminal 104 are transmitted into the Internet 106 via the network interface 108, and routed to the computer terminal 122 of User B 114, via a network interface 123. A client 124 (similar to the client 110) running on the user terminal 122 of User B 114 decodes the VoIP packets to produce an audio signal that can be heard by User B using the handset 126. Conversely, when User B 114 talks into handset 126, the client 124 executed on user terminal 122 encodes the audio signals into VoIP packets and transmits them across the Internet 106 to the user terminal 104. The client 110 executed on user terminal 104 decodes the VoIP packets from User B 114, and produces an audio signal that can be heard by the user of the handset 112.

The VoIP packets for the P2P call described above are passed across the Internet 106 only, and the PSTN network is not involved. Furthermore, due to the P2P nature of the system, the actual voice calls between users of the P2P system can be made with no servers being used. This has the advantages that the system scales easily and maintains a high voice quality, and the call can be made free to the users.

Figure 3:
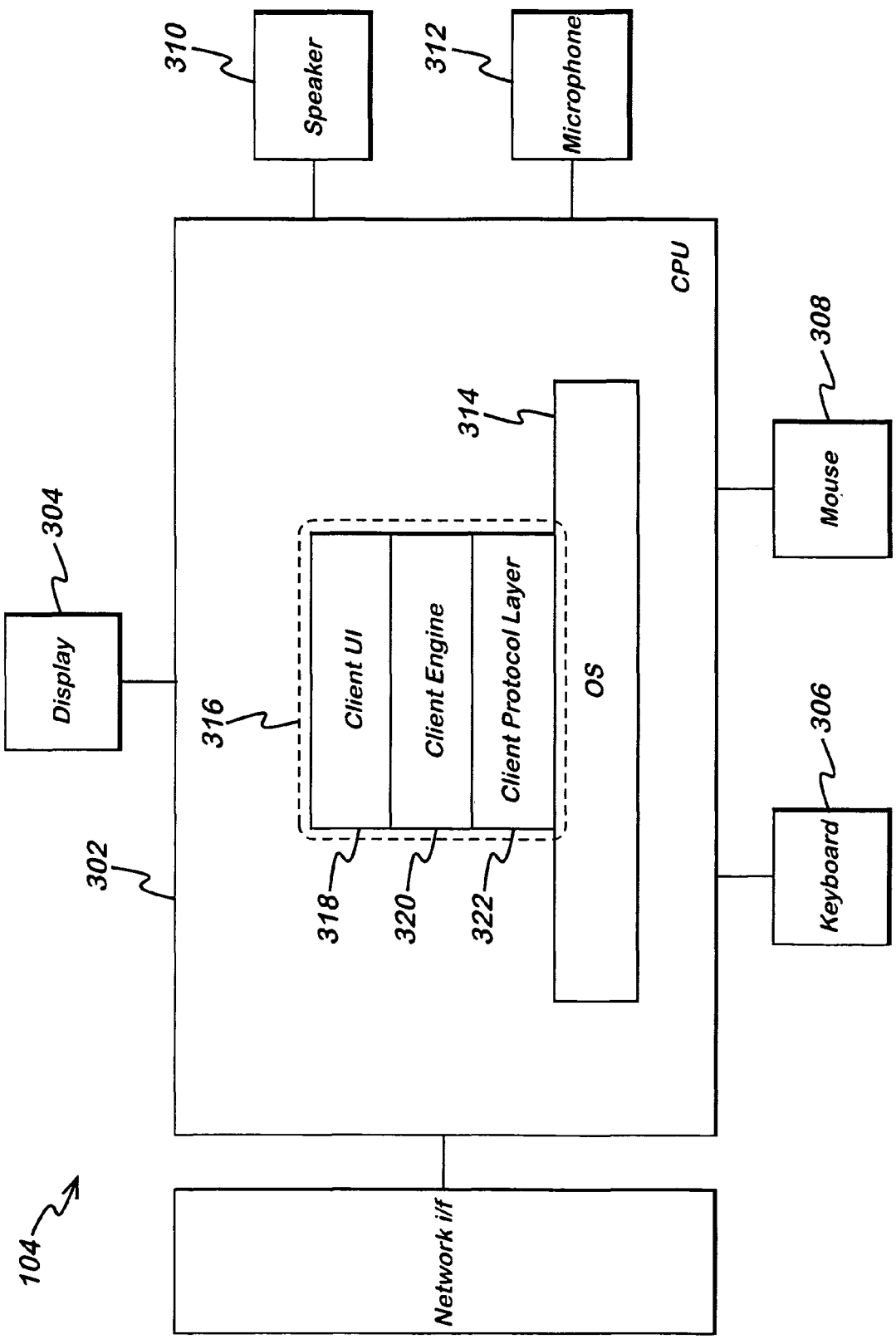
FIG. 3 shows a detailed view of a user terminal executing a client.

FIG. 3 illustrates a detailed view of the user terminal (104) on which is executed client 110. The user terminal 10 comprises a central processing unit ("CPU") 302, to which is connected a display 304 such as a screen, an input device such as a keyboard 306, a pointing device such as a mouse 308, a speaker 310 and a microphone 312. The speaker 310 and microphone 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 112. The software stack shows a protocol layer 322, a client engine layer 320 and a client user interface layer ("UI") 318. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 322 of the client software communicates with the operating system 314 and manages the connections over the P2P system. Processes requiring higher level processing are passed to the client engine layer 320, which handles the processing required for the user to make and receive calls over the P2P system. The client engine 320 also communicates with the client user interface layer 318. The client engine 320 may be arranged to control the client user interface layer 318 to present information to the user via the user interface of the client (as shown in FIG. 2) and to receive information from the user via the user interface. The control of the client user interface 318 will be explained in more detail hereinafter.

Figure 4A:
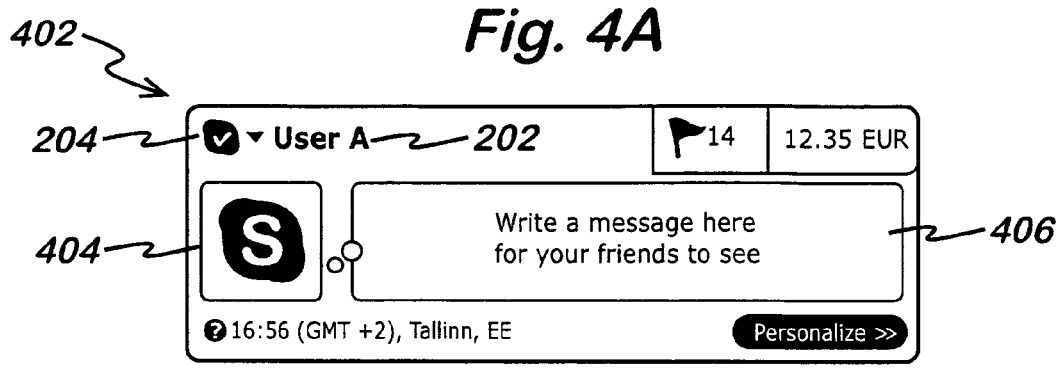
FIGS. 4A to 4C show user interfaces for entering a mood message in a client.
Figure 4B:
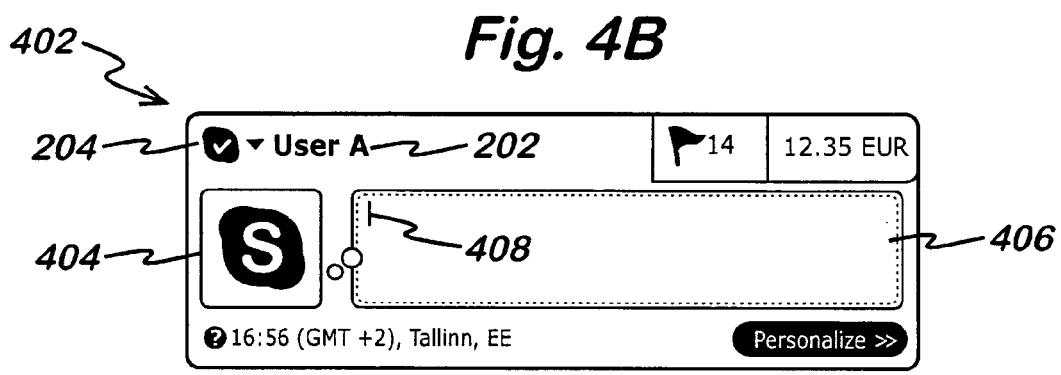
Figure 4C:
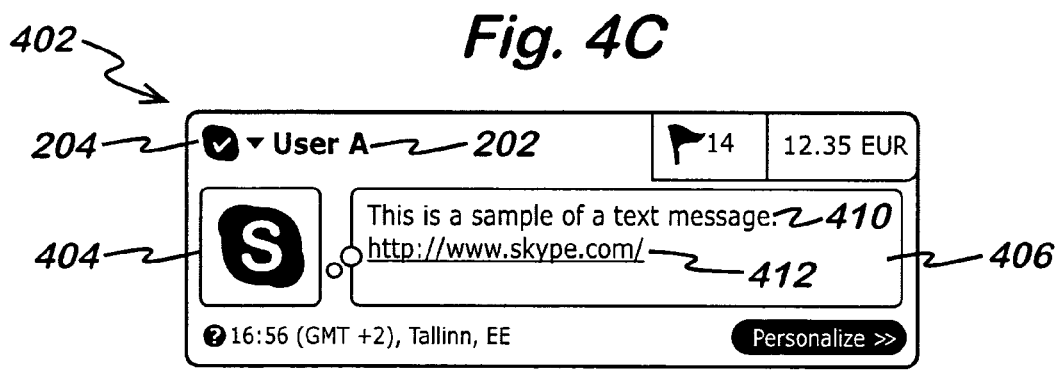

Reference is now made to FIGS. 4A to 4C, which illustrate the known user interface for entering a mood message into a client. FIG. 4A shows a portion of the client user interface for User A 102 (as shown in FIG. 2) that is used by User A to set his mood message. The panel 402 is shown when User A uses the pointing device 308 of the user terminal 104 to select the field displaying his username (labelled 202 in FIG. 2) in the client user interface (200 in FIG. 2). Panel 402 displays the username 202 and presence icon 204 for User A (as in FIG. 2). In addition, panel 402 also displays an avatar 404 that User A has selected to represent himself, and a text-entry box 406 in which User A can enter a mood message.

When User A uses the pointing device 308 of the user terminal 104 to select the text-entry box 406, the panel shown in FIG. 4B is displayed. The text-entry box 406 is displayed in a different colour, and a cursor 408 is present in the text-entry box 406 to indicate to the user that text may be typed.

After User A has typed a mood message into text-entry box 406, then the panel 402 is of the form shown in FIG. 4C. In this example, User A has typed the text message "This is a sample text message" 410 and has also typed a webpage address "http://www.skype.com" 412, which is automatically hyperlinked by the client 112 such that the address 412 becomes a clickable link in the UI, whereby if the user clicks the link using the pointing device 308, the user terminal 104 executes a web-browser program that navigates to the webpage address and displays the webpage to the user on the display device 304.

The mood message that was typed by User A is transmitted to the contact server 113 and stored in User A's data record. In alternative embodiments, the mood message data is not transmitted immediately to the contact server 113, but is sent with the next periodic update message from the client 110 to the contact server 113. In addition, the mood message of User A 102 is also periodically communicated to each of User A's contacts over the P2P system when this is retrieved by the contacts.

Figure 5A:
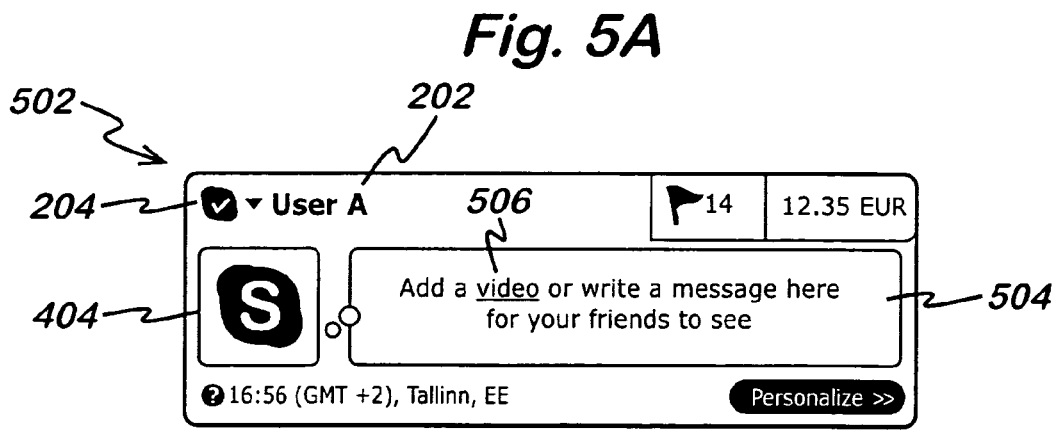
FIG. 5A shows a user interface for adding a multimedia mood message.

Reference is now made to FIG. 5A, which illustrates the UI for adding a multimedia mood message. In the following embodiment, a video is incorporated into a user's mood message. However, it will be appreciated that the same technique may be used for incorporating other types of media into mood messages, such as images and sound recordings.

FIG. 5A shows a portion of the client UI for User A 102 similar to that shown in FIG. 4A. Panel 502 comprises a mood message entry area 504 which displays a different message to that in FIG. 4A. In particular, the message invites the user to enter a text message or to add a video into their mood message, and has a hyperlink embedded for the word "video" 506. The user therefore not only has the option to write a text message, but also to add a video to their mood message. Note that in alternative embodiments, other types of media (such as still images or audio) may also be added to mood messages. In this instance, the hyperlink in FIG. 5A is changed accordingly, for example to read "video or photo".

If the user uses the pointing device to click in the mood message entry area 504 (but not on the word "video") then a cursor is shown as in FIG. 4B, and the user can type a text message, as in FIG. 4C, which is then distributed to the contacts of User A as described previously.

If the user uses the pointing device to click on the word "video", then the user begins the process for selecting a video for insertion into the mood message.

Figure 5B:
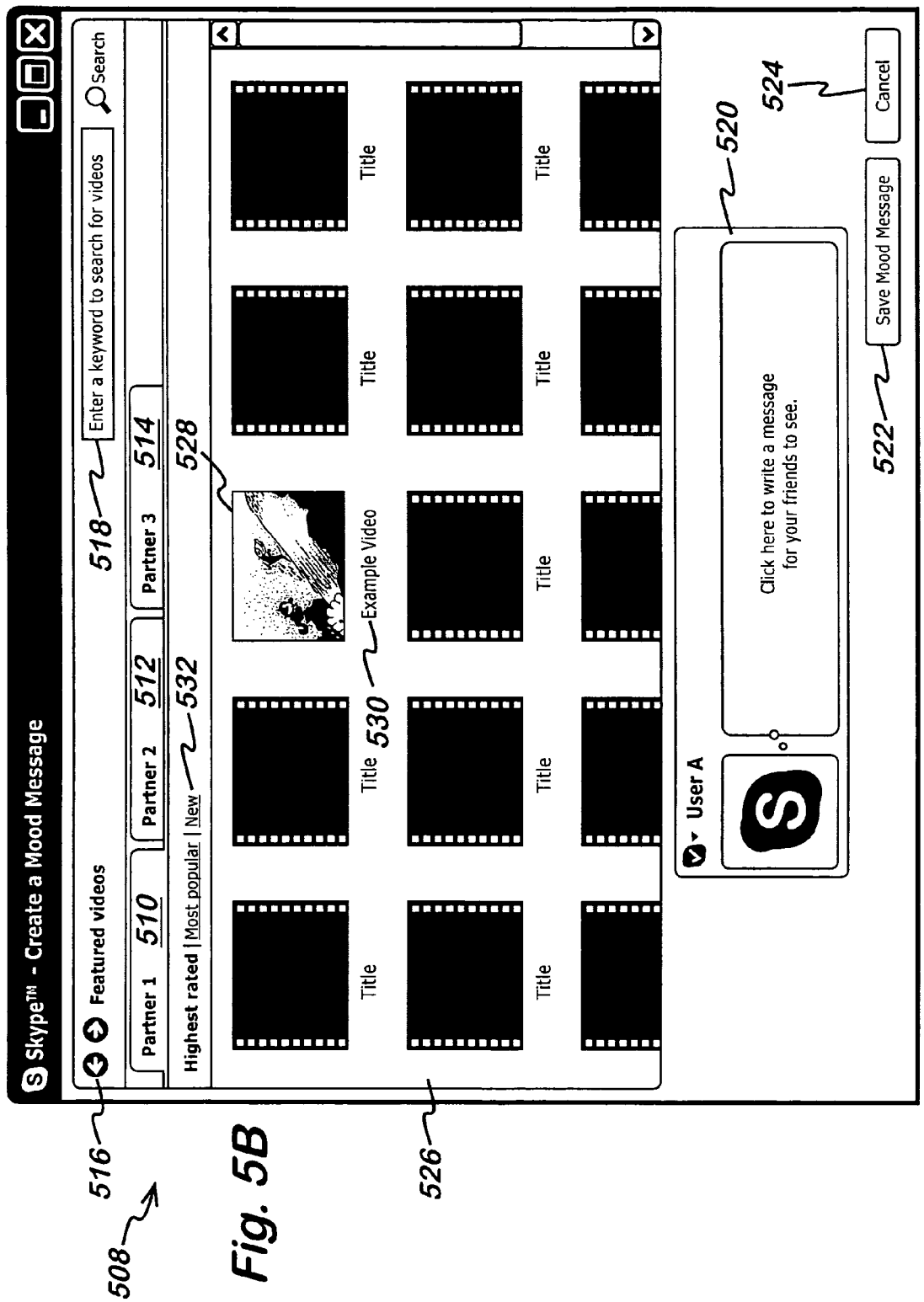
FIG. 5B shows a user interface for selecting a video to add to a mood message.

In preferred embodiments, the selection of a video is made by the user through the presentation of a UI showing a selection of available videos, which is displayed to the user responsive to the user clicking on the word "video". An example of such a video selection UI 508 is illustrated in FIG. 5B. The UI 508 can be considered to comprise two separate elements. The first element is the frame of the UI 508, comprising tabs (510, 512, 514), navigation buttons 516, search field 518, mood message preview area 520 and control buttons (522, 524). The second element is a pane 526 which shows different information for each of the tabs (510, 512, 514). Specifically, pane 526 displays representations of the available videos.

The information for the above-two elements in UI 508 is fetched from different sources. Firstly, the information relating to the frame of the UI is fetched from a content directory 127. The content directory 127 is shown in FIG. 1 connected to the network 106. The client 110 is arranged to communicate with the content directory 127 and retrieve the information to allow the client 110 to present the UI 508 to the user. In particular, the client 110 needs to fetch the information regarding the tabs (510, 512, 514). Specifically, information is needed on the number of tabs (three are shown in FIG. 5B, but more or less tabs may be shown—for example if there is only a single content provider then no distinct tabs are required), the titles of the tabs, and the address of where the information to populate pane 526 for each tab is located. Preferably, this address is in the form of a webpage uniform resource locator ("URL").

Once the information regarding the frame of UI 508 has been retrieved from the content directory 127, the information for pane 526 is retrieved from a content provider. FIG. 1 illustrates three separate content providers (128, 130, 132) connected to network 106. In this exemplary embodiment, these three content providers (128, 130, 132) respectively provide the information displayed for the three tabs (510, 512, 514) of UI 508. The content providers (128, 130, 132) provide the information that populates pane 526 and also provide the actual video data. Preferably, the content providers are third parties, and separate from the P2P software provider. Note that the media content that is made available by the content provider can be provided by individual users uploading the media to the content provider.

In the example shown in FIG. 5B, the UI 508 shows the content for tab 510, labelled "Partner 1". The client uses the address obtained from the content directory 127 for tab 510 to access content provider 128 in order to display the information for this tab. More specifically, the address from the content directory 127 is a URL of a webpage provided by the content provider 128, and the client downloads this webpage (in the form of hypertext mark-up language ("HTML")) over the network 106 and displays the webpage in pane 526. If the user uses the pointing device to select a different tab, such as 512 or 514, then the address provided by the content directory 127 for the selected tab is used to fetch the information to be displayed for this tab.

The purpose of the information shown in pane 526 is to provide the user with a selection of videos that are available to be included in the user's mood message. Pane 526 displays a plurality of thumbnail images (e.g. thumbnail 528) representing each video and a title (e.g. title 530) for each video. The thumbnail image for a video is a small image of a single frame from the video. The thumbnail for each video is generated from the video file itself (e.g. it can be the first frame of the video, or a frame a predetermined time or percentage into the video). Preferably, a list of categories 532 is displayed to allow the user to view a sub-set of the available videos. Furthermore, the user can search the videos by keywords using the search field 518.

Preferably, the content directory 127 is provided by the P2P software provider. This allows the P2P software provider to present a portal to several content providers (128, 130, 132) that are able to provide videos to the users, thereby avoiding the requirement for the P2P software provider to host and/or stream its own videos. The content directory 127 can be updated to add or remove content providers as required.

When UI 508 is displayed on the users terminal 104, the user can use the pointing device to browse the available videos from the different content providers (by using the different tabs 510-514, the categories 532 and the search field 518). When a user sees a video that he is interested in, he clicks the thumbnail to view a preview of the video. When the user has chosen a video, he can select the "save mood message" button 522 to save the video to his mood message.

In an alternative embodiment, the user can also add a video to his mood message without using the video selection UI. For example, the user can copy and paste a URL of a video on a webpage directly into his mood message (e.g. into the field illustrated in FIG. 4B). The client detects that this URL is linking to a video (or other type of media), and automatically generates the required multimedia mood message data (described with reference to FIG. 6A below) in order for the video mood message to be created for this video. In some embodiments, the client can also check that the video URL is from an approved partner (e.g. one of the content providers 128, 130, 132).

In a further alternative embodiment, the user can additionally add a video to his mood message by selecting a control displayed on the webpage of a content provider in association with a particular video. For example, the webpage of a content provider (128, 130, 132) can display videos that can be viewed by a user using a web-browser. The webpage displays an "add to mood" button in proximity with the videos, such that if the button is activated by the user, then data regarding the video is passed to the client to allow the client to generate the required mood message data. Therefore, the client can create a multimedia mood message in the same way as described previously, but without using the video selection UI.

In yet further embodiments, the user can also add videos from a webpage, even if the webpage is not from a content provider that displays a specific "add to mood" button as part of the webpage itself. The P2P software provider can provide plug-in software for the web-browser program that detects that the webpage being viewed contains an embedded video, and overlays an "add to mood" button in proximity to the video in the webpage. If the user selects the button, then data is passed to the client that allows the client to generate the multimedia mood message data in the same way as described above. In preferred embodiments, the client can check that the webpage is from an approved partner (e.g. one of the content providers 128, 130, 132) before permitting the video to be included in a mood message.

Further details regarding the process by which the user creates a multimedia mood message is the subject of a co-pending patent application entitled "Multimedia Mood Messages" by the same applicant (Great Britain Application Number 0712877.0), and is not discussed further here.

Once the multimedia mood message has been chosen by the user, the client generates mood message data to enable the mood message to be displayed in the client and passed to the contacts of the user. The mood message data 602 that is generated by the client is illustrated in FIG. 6A. The mood message data 602 that is generated and stored by the client comprises two main parts. The first part is a media object 604, which contains the data related to the media (e.g. the video). The second part of the mood message data 602 is a text comment 606 that the user has typed to accompany the video (if present).

The media object 604 comprises several data items. A media type field 608 defines the type of media (e.g. video, photo, audio etc.) A media title field 610 includes the title of the media. A content provider identity 612 is used to identify which content provider the media originated from (e.g. 128, 130 or 132 in FIG. 1). A content provider uniform resource identifier ("URI") 614 provides an address of where further information may be found regarding the content provider (e.g. the address of the content provider webpage). A media URI 616 is the address of where the media is stored, and this is the address from where the media is streamed when it is played. The thumbnail image for the media is stored in the media object at 618. Preferably, the thumbnail image is provided by the content provider.

The multimedia mood message then appears to the user in the client UI as shown in FIGS. 6B and 6C. FIG. 6B shows the same panel 502 of the client UI as illustrated in FIG. 5A. However, the panel 502 now includes the thumbnail image 620 for the video selected by the user (this is read from the thumbnail image 618 in the media object 604). The user also has the option to add a text comment at this stage to accompany the video (if this was not done previously, or if the user wishes to amend a previously entered comment). This is achieved by the user clicking in the text-entry region 622 and typing. FIG. 6C illustrates the case where the user has typed a message 624 in region 622.

Therefore, at this stage, the user (in this case User A) has selected a video to be included in his mood message, and generated corresponding multimedia mood message data 602. The next stage is for the multimedia mood message to be passed to User A's contacts.

Referring again to FIG. 1, the video mood message data 602 as shown in FIG. 6A is transmitted from the client 110 to the clients of the contacts of User A over the P2P system. According to one embodiment, the multimedia mood message data 602 for User A is retrieved periodically by the contacts of User A 102. For example, the client 124 of User B 114 (who is a contact of User A) may periodically request mood message information from each of its contacts, thereby requesting the mood message information from User A. The multimedia mood message information is transmitted from User A to User B responsive to such a request. In an alternative embodiment, the multimedia mood message data 602 is transmitted to each of the contacts of User A as soon as the mood message is created or changed (i.e. it is pushed to the contacts immediately). In a further alternative embodiment, the multimedia mood message data 602 is pushed to the contacts at periodic intervals.

As User B 114 is a contact of User A, the multimedia mood message data 602 is provided to the client 124 of User B over the P2P system. The multimedia mood message data must be processed by the client 124 before the mood message is displayed to User B. The client 124 reads the mood message data 602 and analyses the media object 604. For example, the client 124 will read the media type field 608 to determine the type of media referred to in the media object 604 (e.g. a video in this example). The client will also extract the thumbnail 618 so that it may be displayed in the UI of the client 124 next to the contact entry for User A. The media URI 616 is extracted and hyperlinked to the thumbnail image in the client UI. The media title 610 is also read for display in the client UI.

Figure 7:
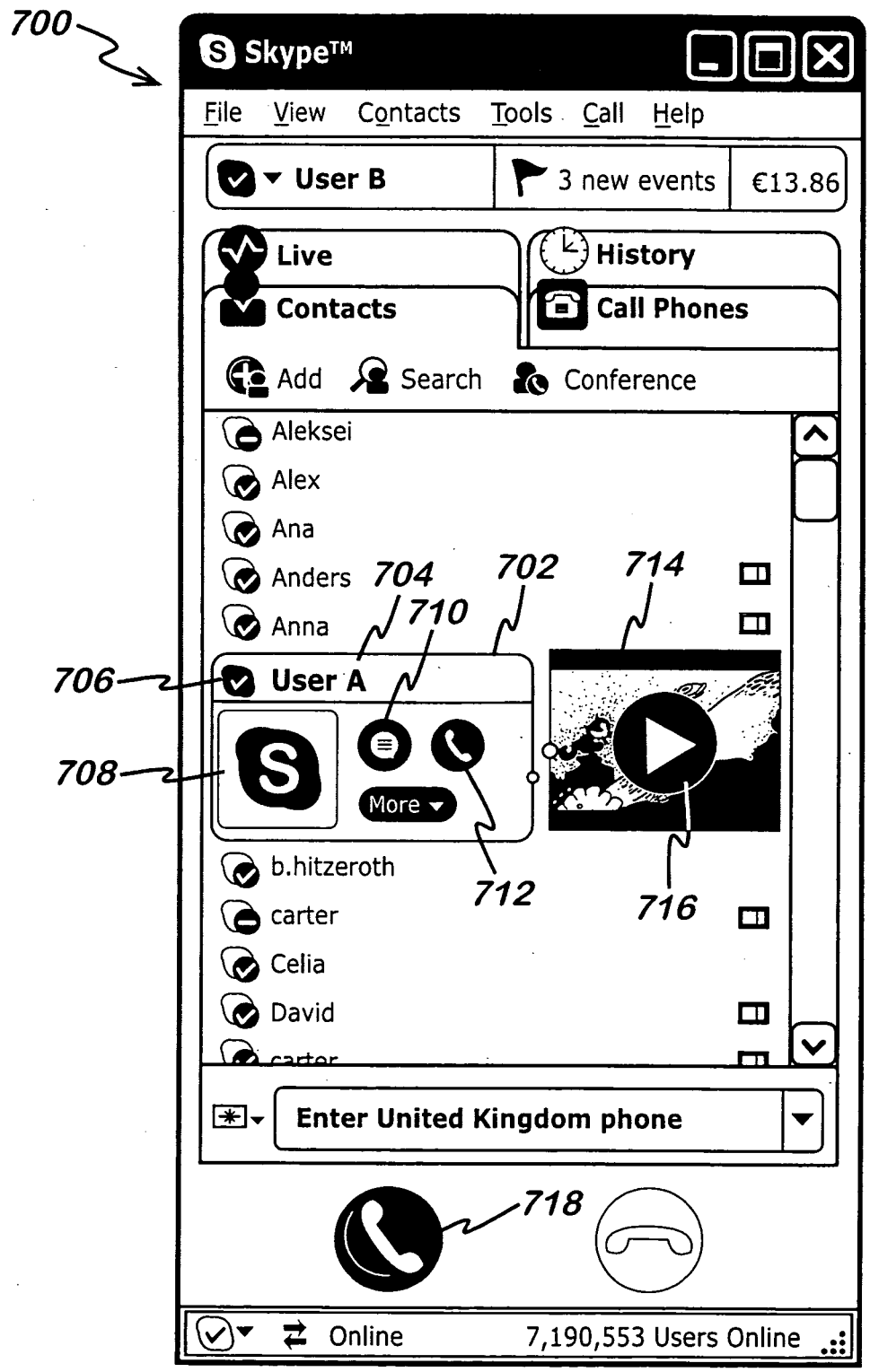
FIG. 7 shows a client user interface comprising a contact with a multimedia mood message.

The result of the multimedia mood message data 602 being displayed in User B's client is illustrated in FIG. 7. FIG. 7 shows the client UI 700 for User B with the contact for User A 702 expanded. The contact for User A 702 shows User A's name 704, presence state 706, avatar 708, and buttons for initiating an IM chat 710 or voice call 712 with User A. Next to the contact 702 for User A is displayed a thumbnail image 714 of the video chosen by User A for his mood message. The thumbnail image 714 is extracted from the thumbnail field 618 of the multimedia mood message data 602. The thumbnail image 714 also has a play button 716 overlaid on it, to indicate to the user that the video can be played by clicking on the thumbnail image 714. If User B uses his pointing device to place a pointer over the thumbnail image 714, then the text comment provided with the video (if any) is displayed. Alternatively, if no text comment has been provided, the title of the video is displayed.

As mentioned previously, a problem with User A 102 sharing multimedia content in a mood message is that it relies on User B 114 actively selecting to view the video in the mood message (by activating the play button 716). To counter this, a system and method is utilised whereby the video from User A's mood message is automatically displayed to a contact of User A (e.g. User B) whenever that contact attempts to establish a call with User A. More specifically, during the time between the call being initiated by the contact and the time at which User A answers the call, the video is played to the contact. This technique can be referred to as a "video ringback".

Reference is now made to FIGS. 8A to 8D, which illustrate the process by which a video ringback is displayed to User B 114 when he is calling User A 102. In this example, User A 102 has created a video mood message, and the mood message data has been passed to User B 114, such that the video mood message is displayed in User B's client UI 700, next to User A's name (as illustrated in FIG. 7). User B 114 initiates a call with User A 102, by selecting the call button 712 in the client UI 700 (or alternatively using call button 718). The client 124 of User B 114 then attempts to establish a connection with the client 110 of User A 102 over the network 106 in order to set up a voice call.

In addition, the client 124 of User B 114 also detects that the contact being called (User A in this example) has a video mood message. In response to detecting this, the client attempts to start a video ringback. The client 124 reads the mood message data 602, and specifically the media URI 616. The client uses the media URI 616 to contact the location at the content provider (128, 130, 132) where the video is stored, and initiate streaming of the video to the client 124 of User B 114.

Figure 8A:
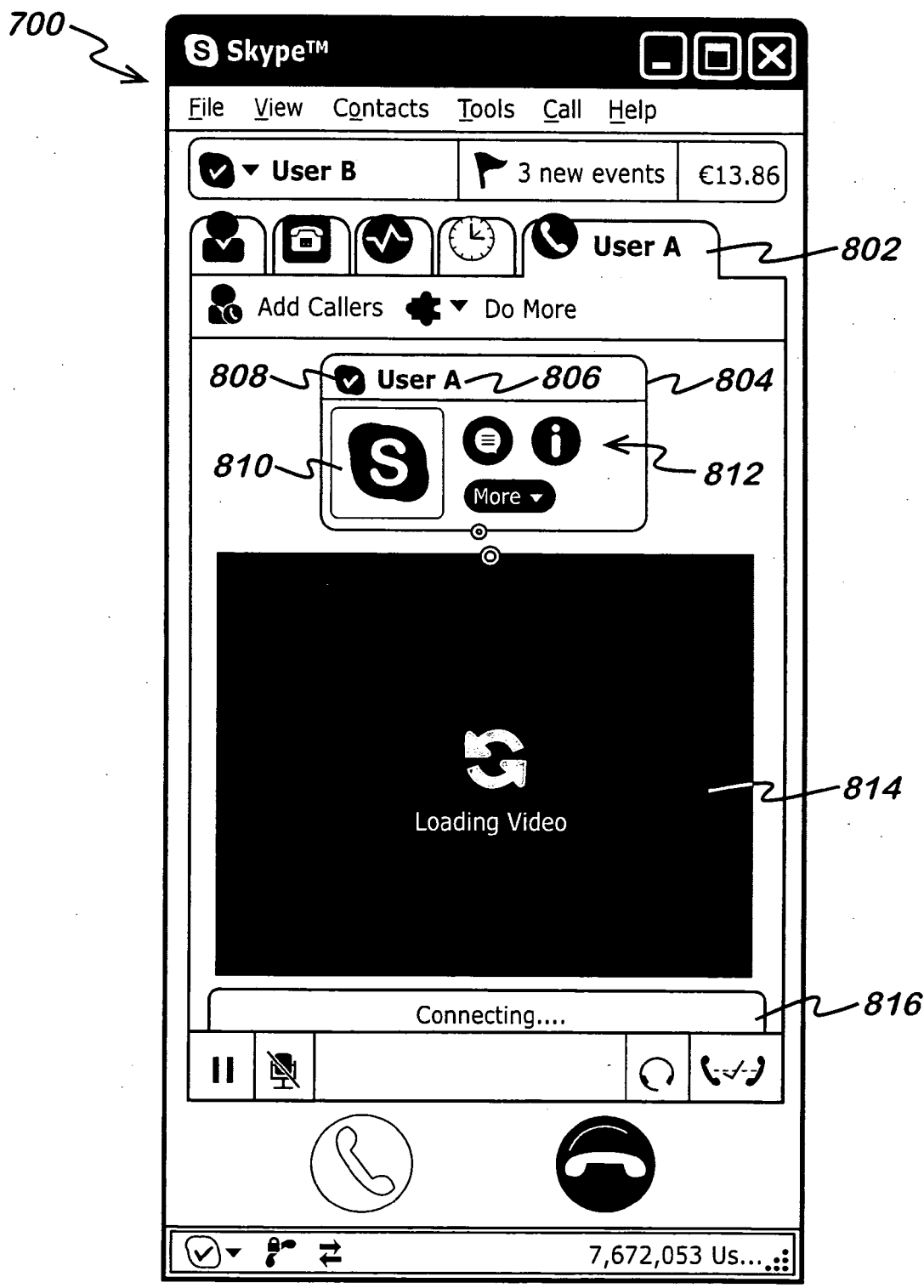
FIGS. 8A to 8D show client user interfaces in which a video ringback is displayed.

The UI 700 of the client 124 of User B at the beginning of this process is shown illustrated in FIG. 8A. Compared to FIG. 7, the UI shown in FIG. 8A now displays a call tab 802 (indicating the name of the person being called) instead of the contact list tab. Shown in the call tab 802 is a contact card 804 for the user being called (User A 102). The contact card 804 comprises the name of the callee 806, their presence state 808 and avatar 810, as well as further control buttons 812 that are out of the scope of this description.

Below the contact card is an embedded video player 814. In FIG. 8A, the client 124 is loading the video from User A's mood message (using the media URI 616), and this is reflected in the image displayed in the embedded video player 814. The status of the call to User A 102 is shown at 816. In FIG. 8A, User A has not yet answered the call, and the status is "connecting".

Figure 8B:
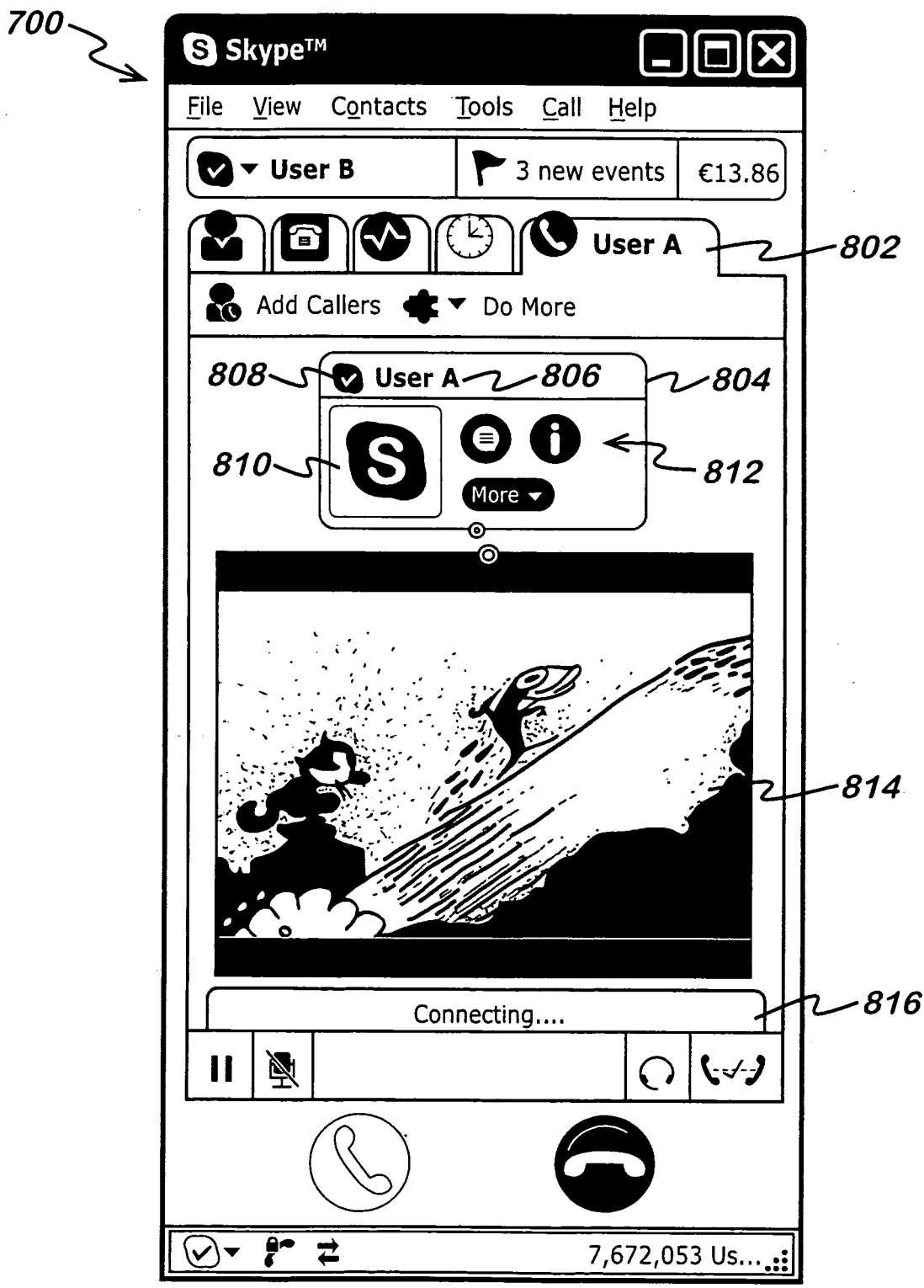

When the video located at the media URI 616 has been loaded, the video is played back to User B 114, whilst he is waiting for User A 102 to answer the call. This is illustrated in FIG. 8B, which shows the client UI 700 as in FIG. 8A, except that the video from User A's mood message is now being played to User B in the embedded video player 814.

Preferably, the client 124 of User B 114 initially plays an audible ringing tone to User B 114 whilst the video begins to be played back, in order to indicate to the user that the call is waiting to be answered. After the ringing tone has been played for a predetermined period of time (e.g. 3 seconds), the ringing tone is faded out, and the sound that accompanies the video is faded in.

Figure 8C:
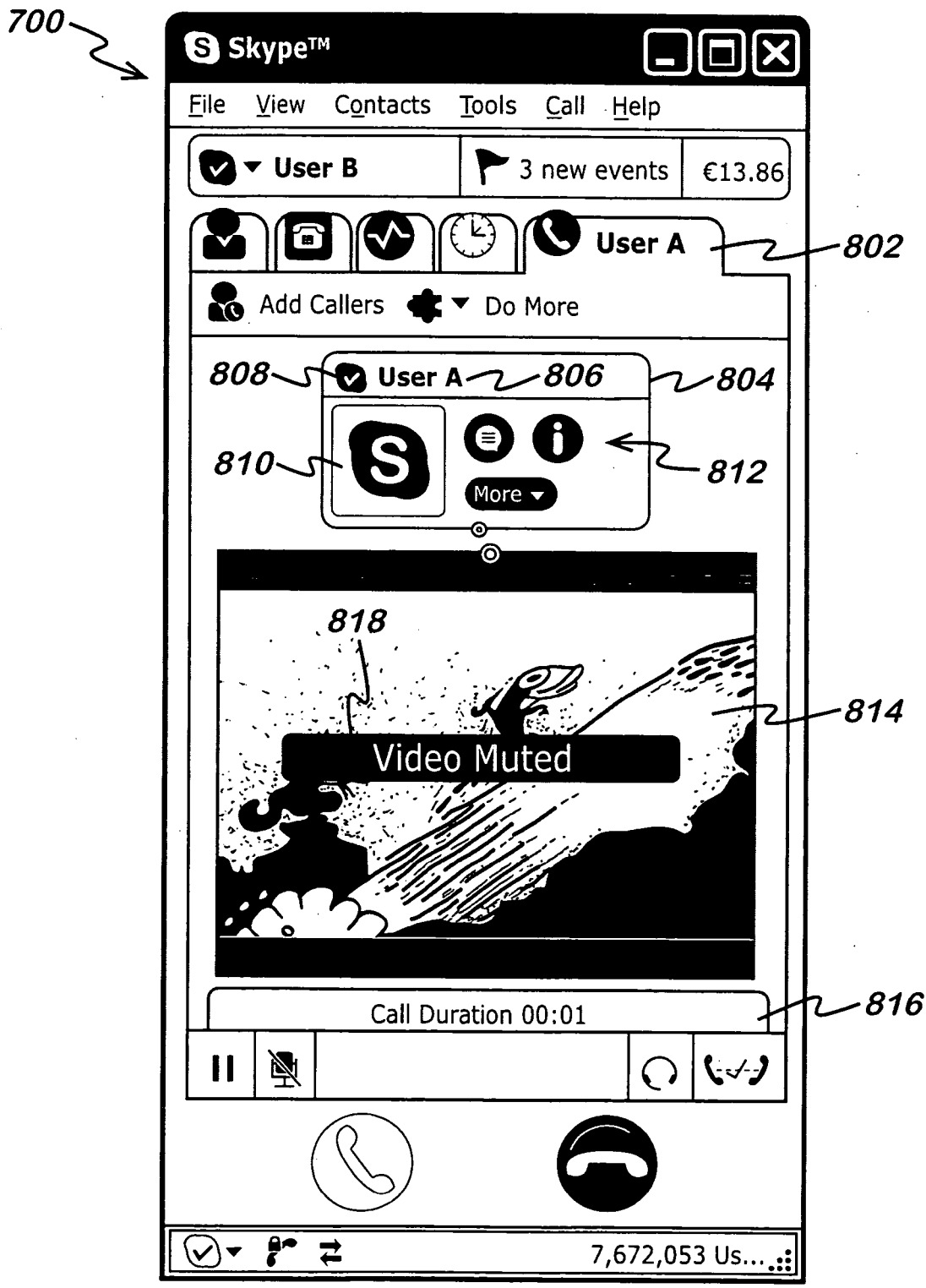

When User A 102 answers the call, the video playback is muted, so that the sound of the video is not playing over the top of User A's voice. This is shown in FIG. 8C. The embedded video player 814 is showing a message 818 over the top of the video to indicate to User B 114 that the video has been muted. The playback of the video (minus the sound) continues behind the message 818. The status 816 now shows that the call is connected, and displays the duration of the call.

Figure 8D:
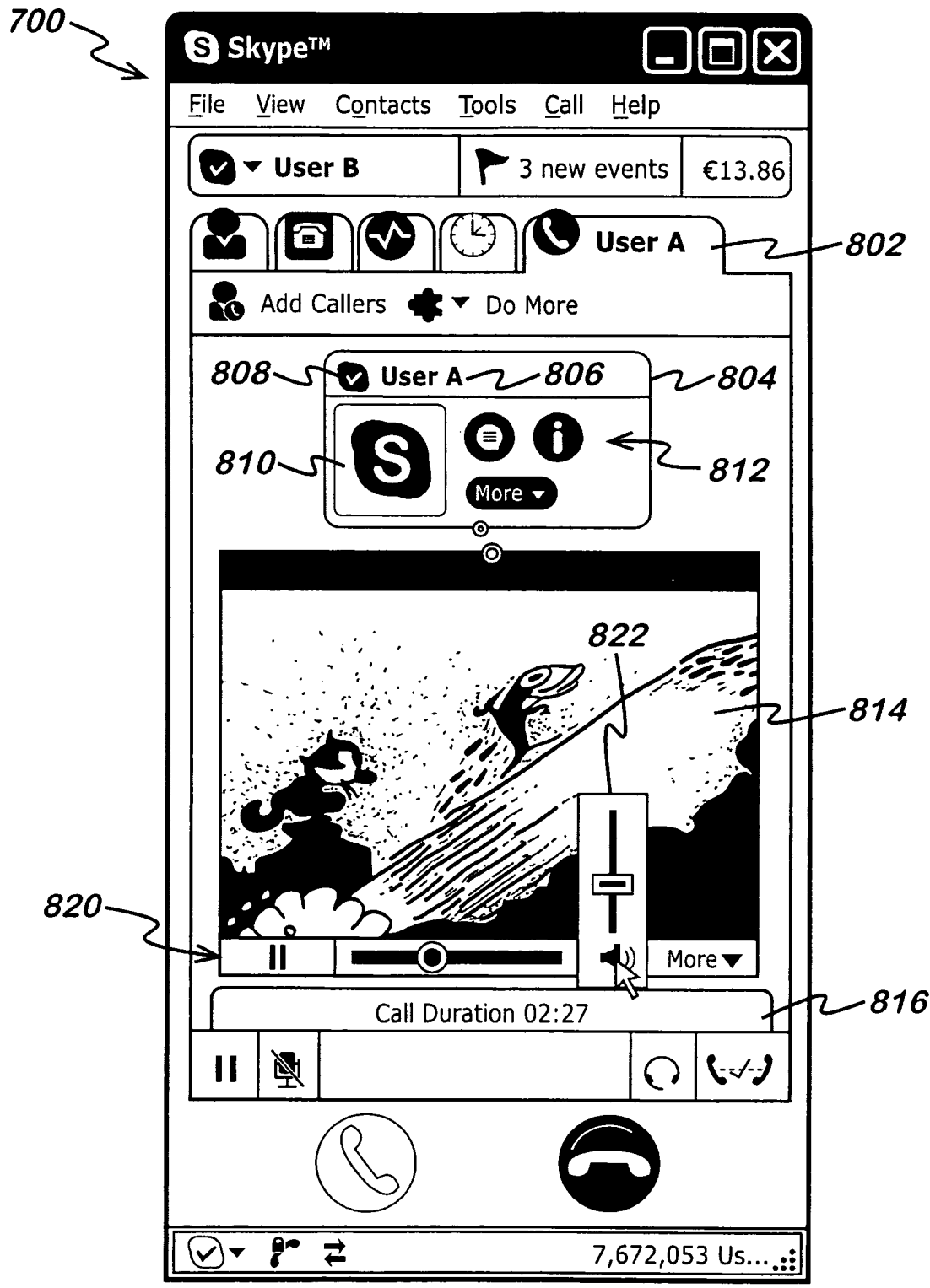

If User B 114 wishes to unmute the video, so that he can continue to hear the sound of the video even after User A has answered the call, then this can be achieved by User B moving the cursor with the pointing device over the embedded video player in order to display a control bar 820, as shown in FIG. 8D. More detail on the operation of the control bar 820 is described below with reference to FIG. 10A to 10C. The control bar 820 comprises a volume control button 822, and activation of this button by User B 114 allows the volume to be restored, so that the sound of the video can be heard.

In alternative embodiments, the client pauses the content responsive to User A answering the call, rather than the content being muted. In this case, the message 818 displayed over the video in FIG. 8C indicates that the video is paused. The playback of the video can be resumed by the user by selecting a play button on the control bar 820, as described in more detail with reference to FIG. 10A to 10C, below.

Therefore, the above-described process ensures that a video shared by User A 102 in his mood message is seen by his contacts, due to it being played automatically to them during a time when otherwise only a normal ringing tone would be heard.

Figure 9A:
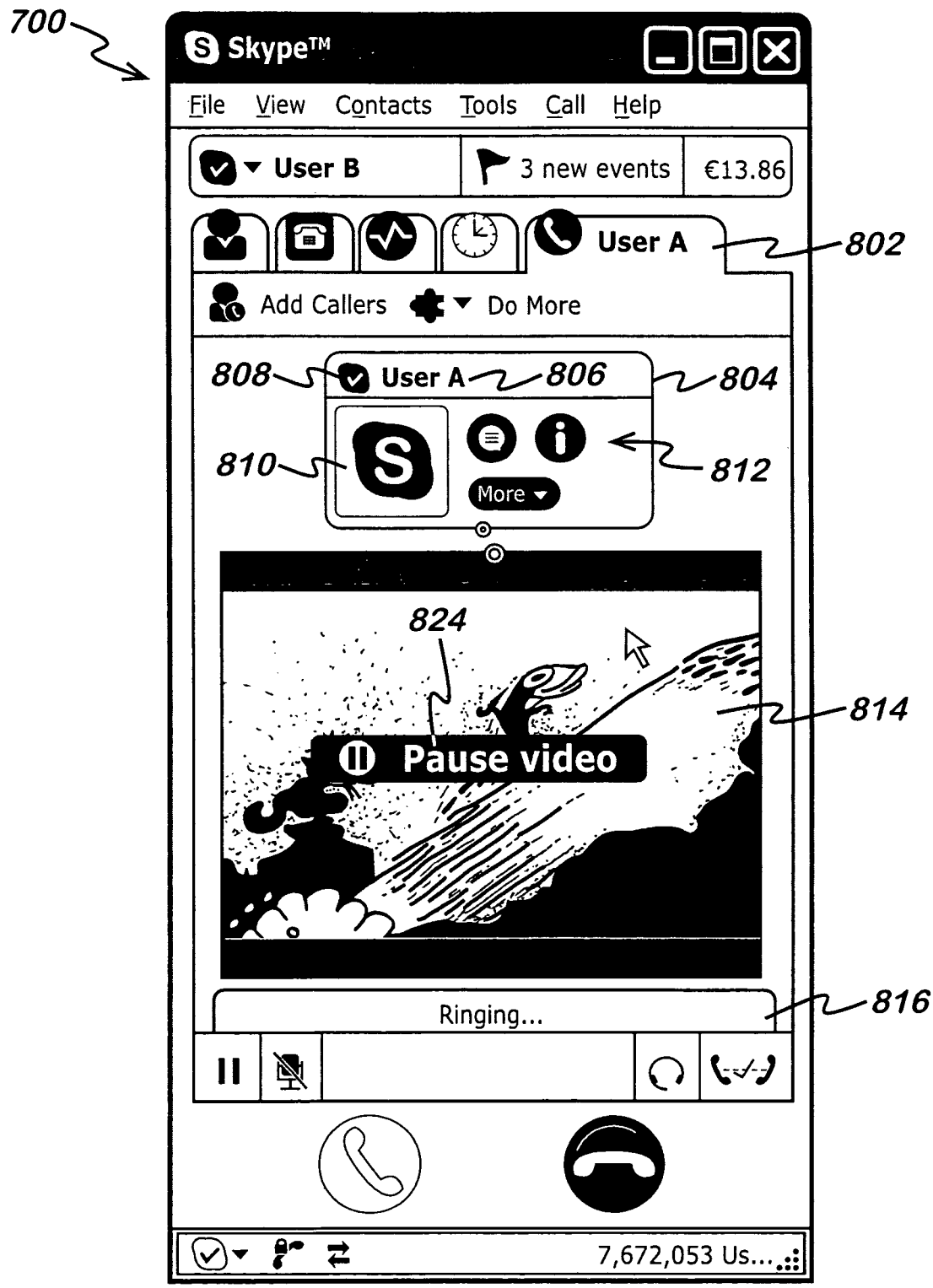
FIGS. 9A to 9B show client user interfaces in which a video ringback can be paused.
Figure 9B:
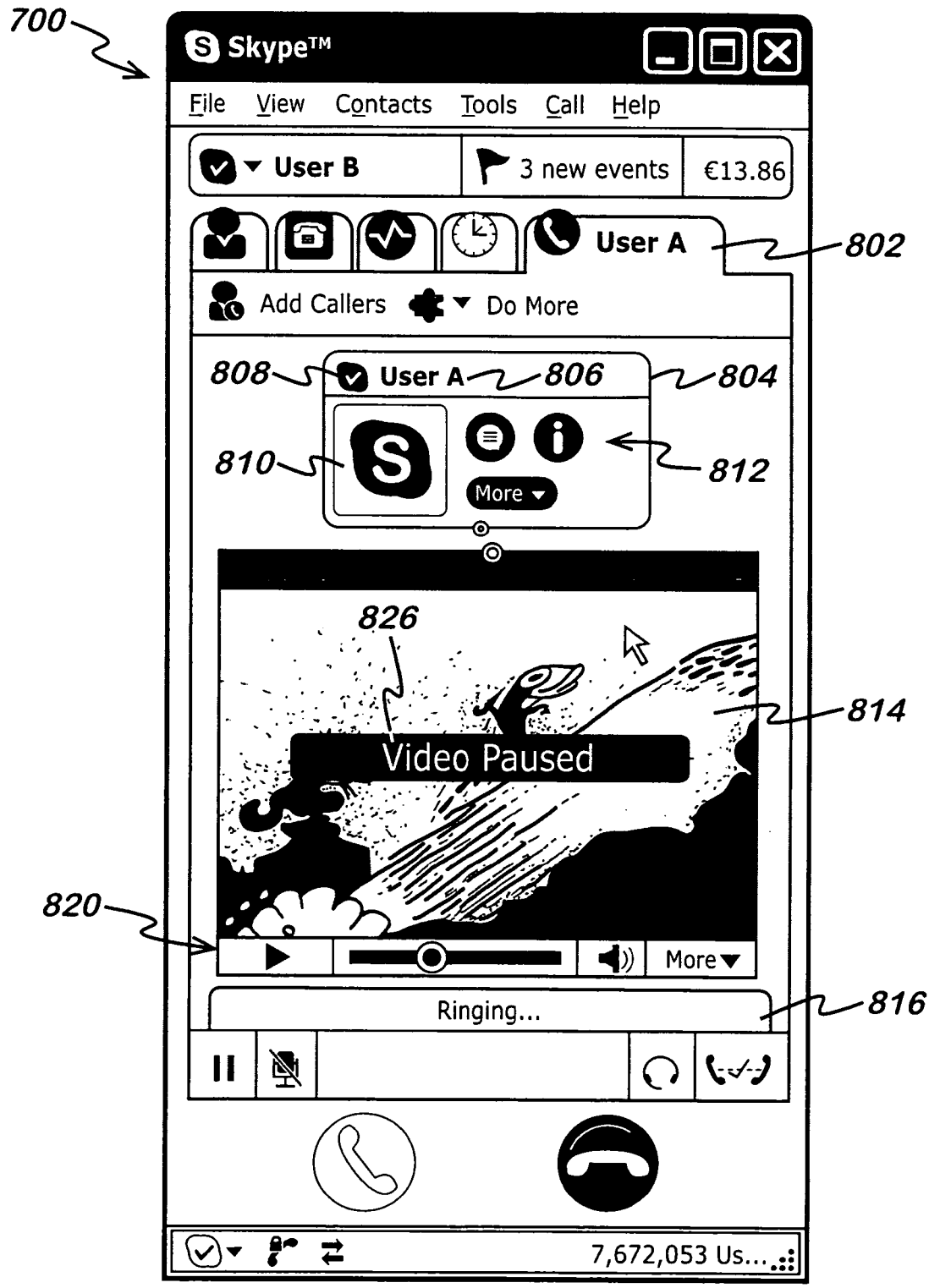

When User B 114 first makes a call to User A 102, he may be surprised by the video that begins playing automatically. It is therefore preferable to provide a way for the video to be rapidly paused by the user, if it is inappropriate for it to be played. This is illustrated in FIGS. 9A and 9B. When the video is being played to User B 114 whilst waiting for User A 102 to answer the call, if the cursor is brought anywhere over the embedded video player 814 then a message 824 is displayed to User B 114 indicating that the video can be paused by clicking on the playing video. This therefore gives the user a large region to click on with the pointing device, allowing the user to rapidly pause the video if required.

The result of the user clicking on the video with the pointing device is shown in FIG. 9B. The playback of the video has been paused, which is indicated to the user with message 826. The control bar 820 is displayed to the user to allow him to resume playback if desired.

Figure 10A:
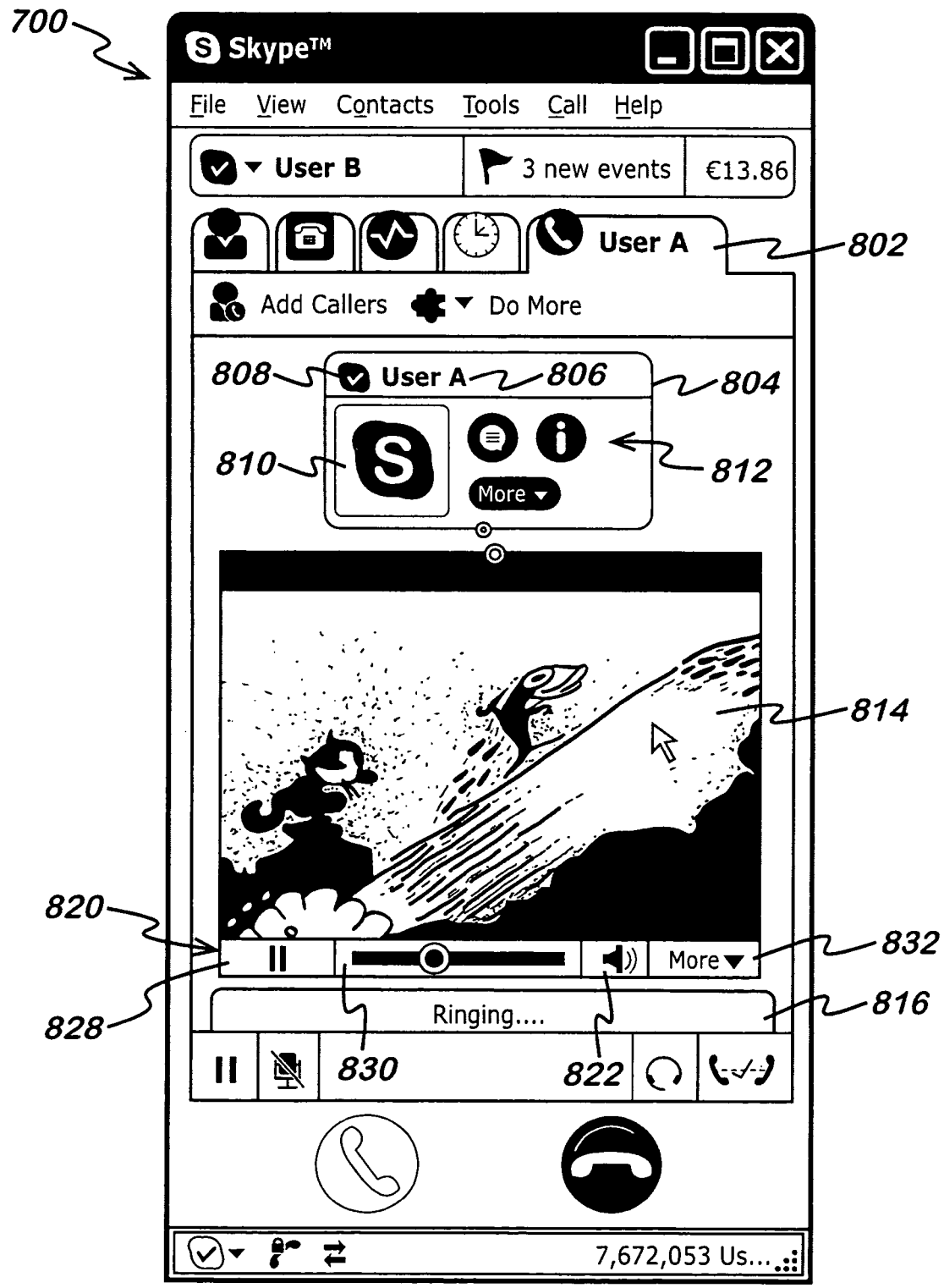
FIGS. 10A to 10C show client user interfaces with control options for a video ringback.
Figure 10B:
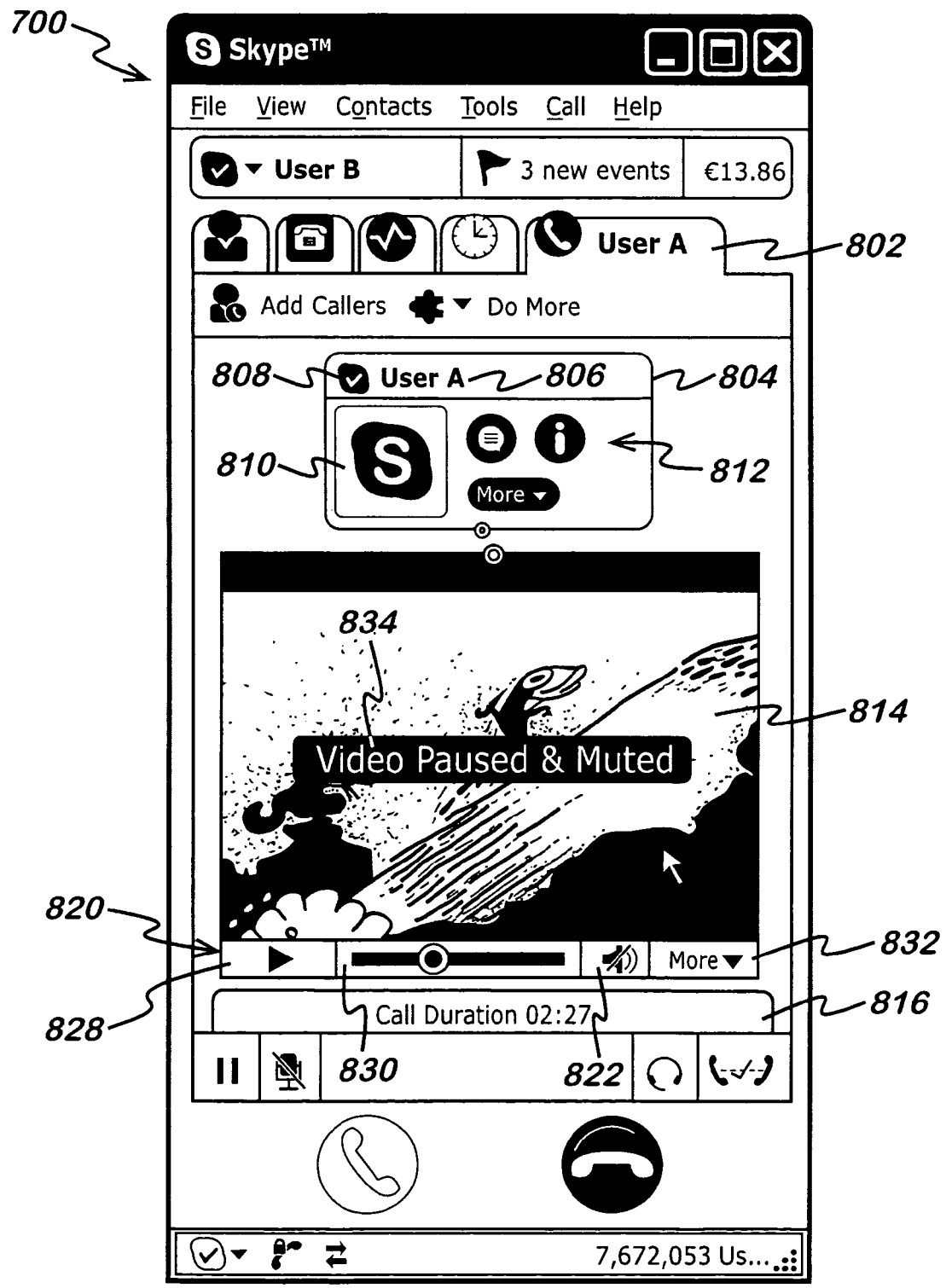
Figure 10C:
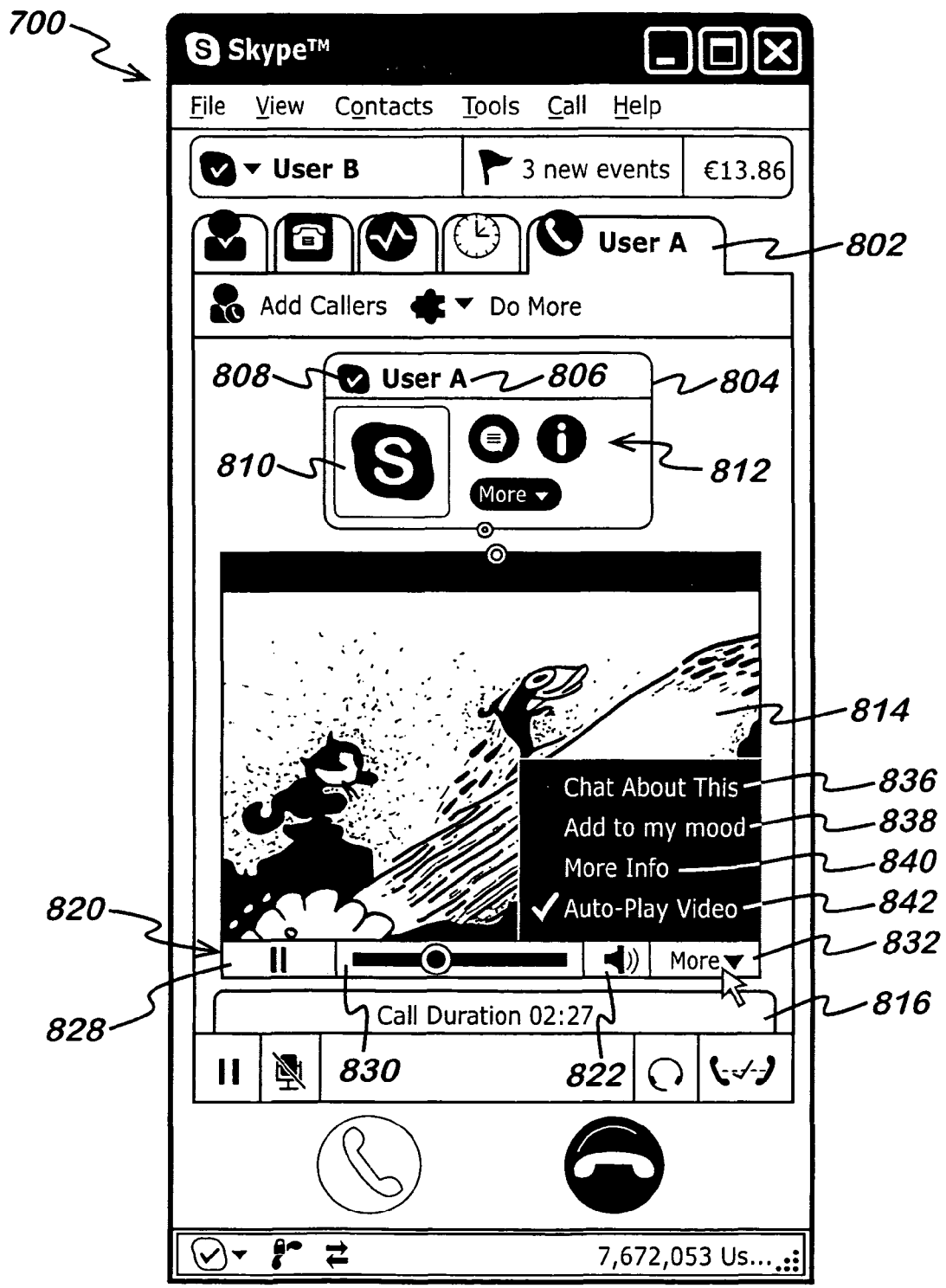

Reference is now made to FIG. 10A to 10C, which illustrate in more detail the functions of the control bar 820. At any point after the video has been initially paused by clicking on the video (as described above with reference to FIGS. 9A and 9B) or during a call, if the cursor is placed over the embedded video player 814, then the control bar 820 is displayed at the bottom of the video.

The control bar 820 comprises a play/pause button 828, a progress bar 830, a volume button 822 and a menu button 832. The play/pause button toggles between playing and pausing the video, and the symbol shown on the button changes accordingly, depending on the current state of the video (i.e. whether it is currently playing or paused). When the volume button 822 is activated, a volume slider is shown to allow the user to change the volume, or the sound can be muted. When the video is either paused, muted, or both, a message is shown overlaid on the video. FIG. 10B shows an example of this for the case where the video is both paused and muted, as reflected in message 834.

FIG. 10C shows the options that are presented to User B 114 when the menu button 832 is selected. The first option is a "chat about this" 836 option. If the "chat about this" option 836 is activated, a dialogue box is opened that displays to User B a list of all his contacts. User B can select from this list the contacts with which he wishes to initiate an IM chat conversation. When he has selected the contacts, an IM chat session is established with these contacts, and the video from the embedded video player 814 is automatically inserted into the beginning of the IM chat conversation.

The second option is a "add to my mood" option 838. If this option is selected, then the video that is shown in the embedded video player 814 (i.e. video from User A's mood message) is added to User B's mood message.

The third option is a "more info" option 840. The "more info" option provides the user with more information regarding the video. Preferably, this is provided by the client 124 executing a web browser and navigating to a webpage of the content provider, the address of which was provided in the content provider URI 614 field of the mood message data 602.

The fourth option is an "auto-play video" option 842. Preferably, this option is enabled by default. When enabled, this option allows videos that are in a callee's mood message to be played automatically when a call is made to the callee (as described with reference to FIGS. 8A to 8D). If this option is disabled, then the video is not played automatically on making the call, but instead a static frame of the video is shown with the control bar 820 below it, allowing the video to be played if desired. Furthermore, the client 124 preferably monitors the user behaviour, so that if the user pauses the ringback video a predetermined number of times consecutively, then the client will pop-up a message to the user, suggesting that the "auto-play video" option be disabled.

In further embodiments, the menu button 832 can also present a fifth option (not shown in FIG. 10C). The fifth option allows the user to report problematic content to the content provider. If this option is selected, then a web browser program is executed on the user's terminal, which navigates to a webpage comprising a form which the user can fill out to report a problem with the content (e.g. copyrighted material, unsuitable subject-matter, etc). The information entered in this form is provided to the content provider, who can choose to remove the video in response thereto.

Figure 11:
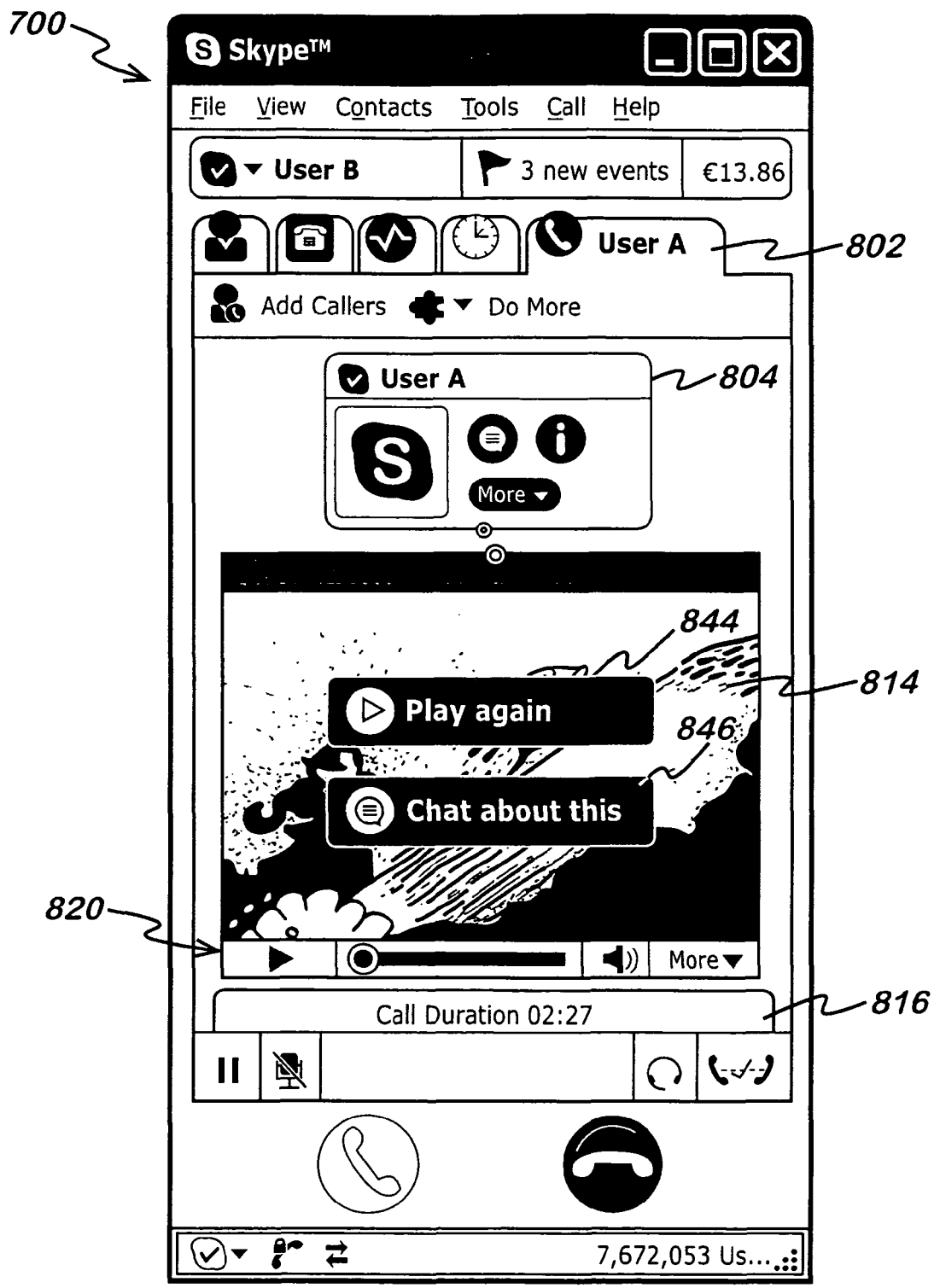
FIG. 11 shows a client user interface with options displayed following the end of a video.
Figure 12:
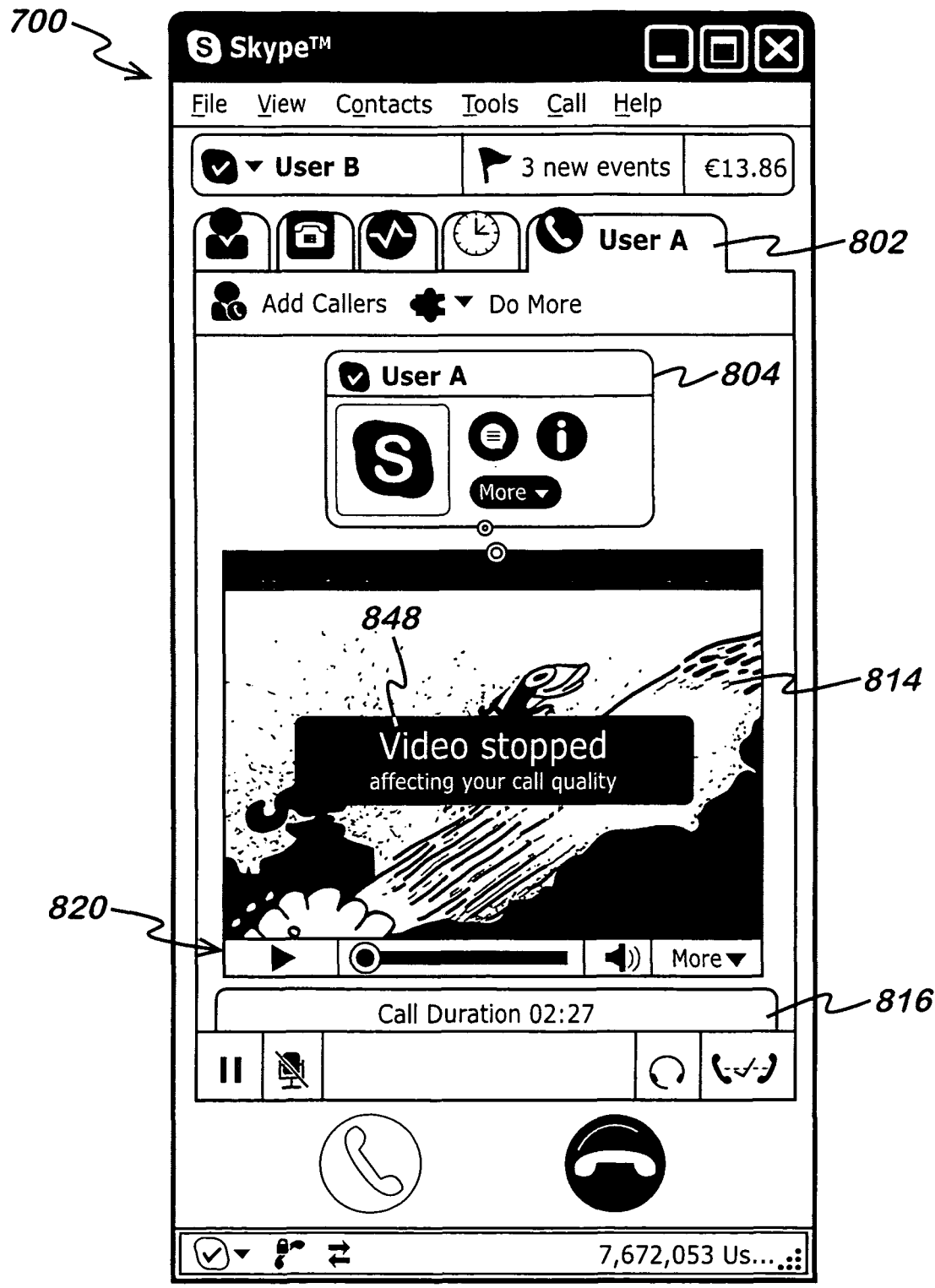
FIG. 12 shows a client user interface with a message displayed if a video ringback affects call quality.

Reference is now made to FIG. 11, which shows the client UI 700 when the video has completed playing. Two buttons are displayed to the user, overlaid over the video. The first is a "play again" button 844 that allows the user to playback the video from the start. Activation of the play/pause button 828 also has the same effect. The second button is a "chat about this" button 846, which has the same function as selecting the "chat about this" option 836 from the menu button 832 as described above. Playback of the video to the user has requirements both in terms of processing power (i.e. CPU resources) and on the network connection of the user's terminal (i.e. bandwidth resources). As a result of this, it can sometimes be found that playback of the video after the called user has answered can affect the quality of the call. The client monitors the CPU usage, bandwidth, and/or call quality, and if it is determined that the video is detrimentally affecting these aspects, then the video playback is stopped. This is reported to the user as shown in FIG. 12, using message 848.

Figure 13:
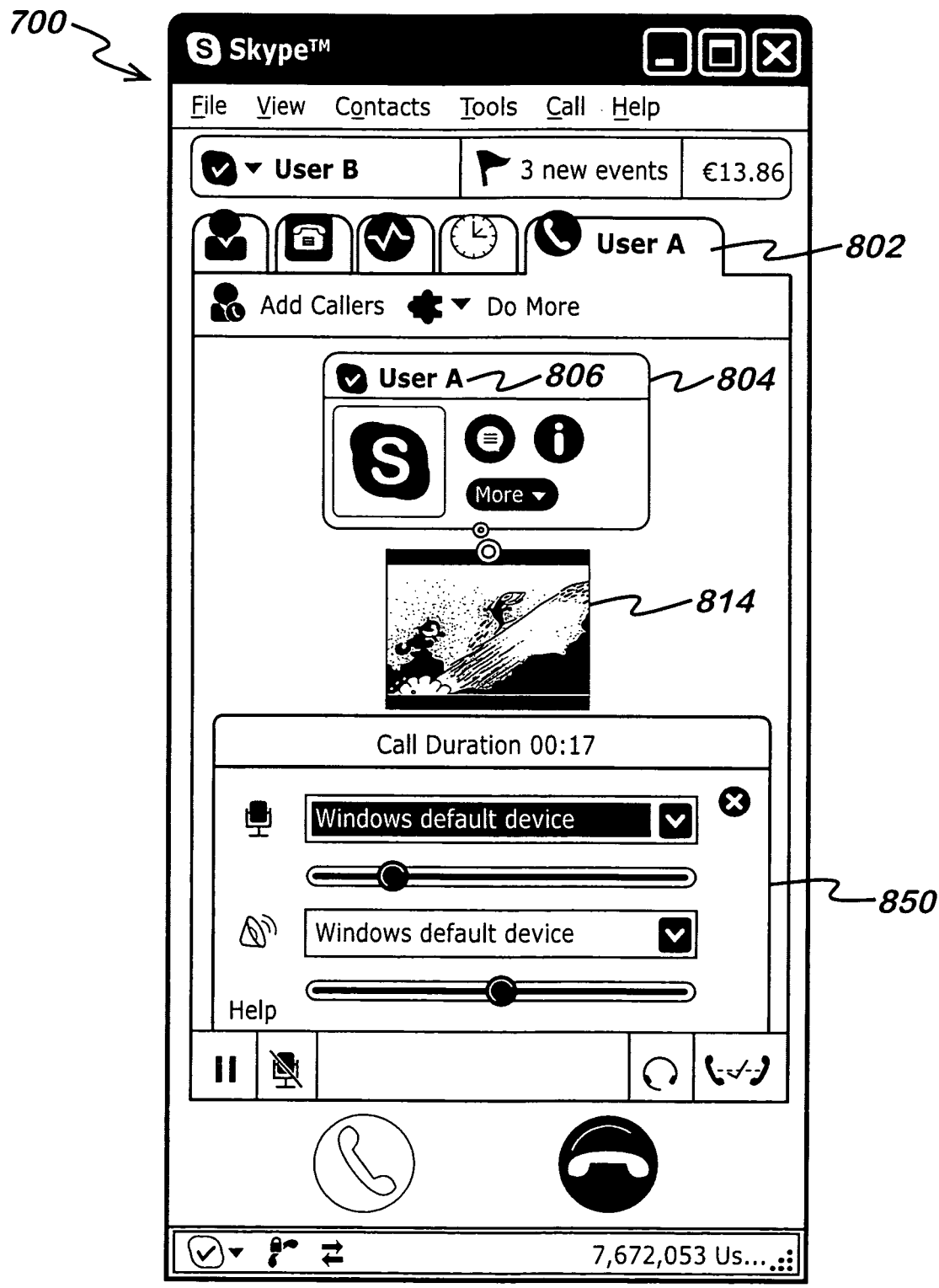
FIG. 13 shows a client user interface with a resized video.

Furthermore, during a call, User B 114 may need to use controls related to the voice call, such as adjusting sound settings, placing the call on hold or muting his microphone. The controls require space on the call tab 802. If any of these controls are activated and there is insufficient room to accommodate the controls, then the video is paused and reduced in size as shown in FIG. 13. In this example, the user has opened an audio settings panel 850, and this has resulted in the size of the video being reduced accordingly.

Figure 14:
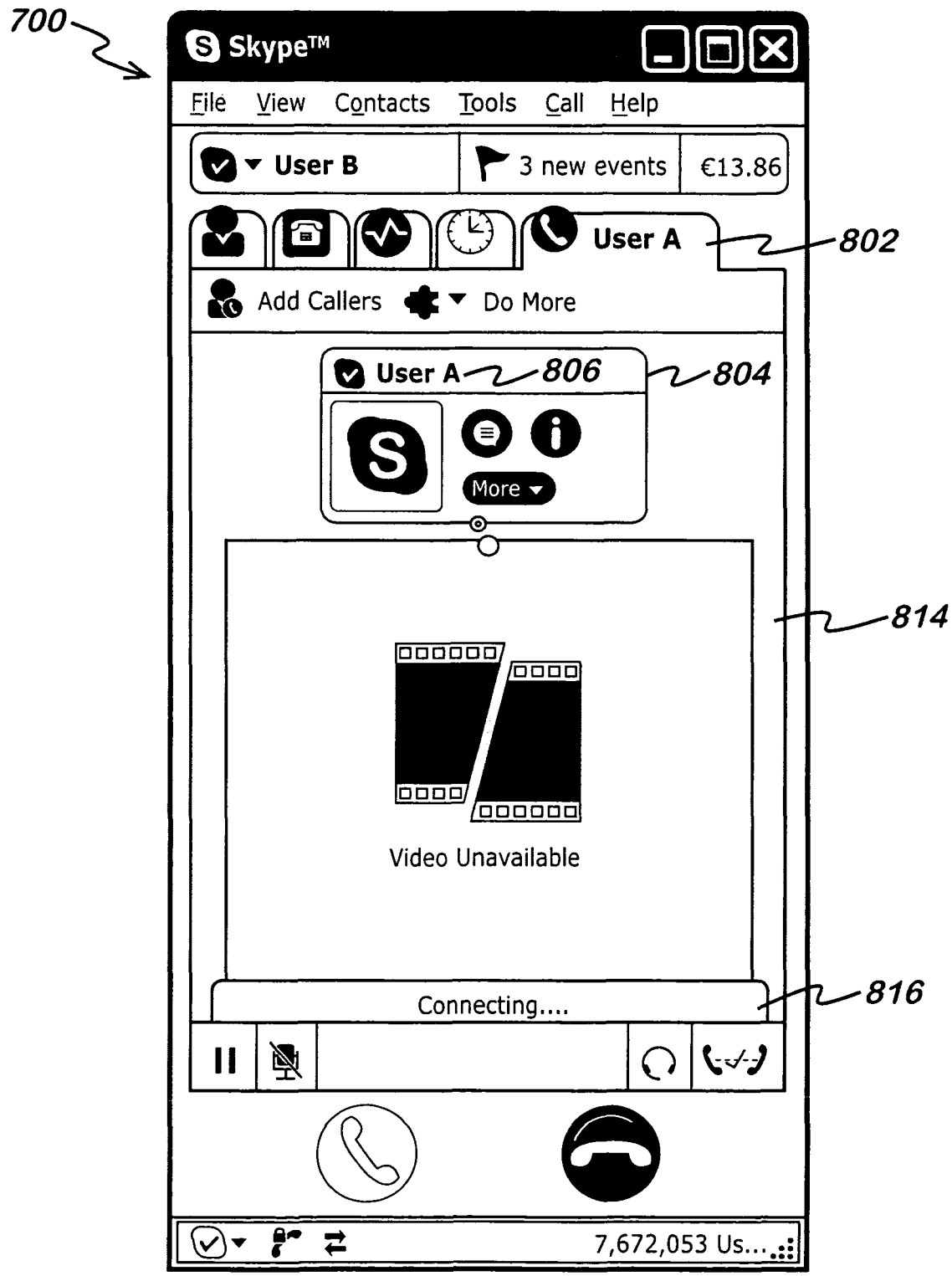
FIG. 14 shows a client user interface for an unavailable video.

If the client 124 is unable to play the video from the media URI 616 provided by User A's mood message (e.g. due to the video being removed, or a network failure), then an error message is shown to the user. This is illustrated in FIG. 14, where the embedded video player 814 shows a "video unavailable" message.

In preferred embodiments, before the video is displayed to User B, the client 124 will perform a check to ensure that the media URI 616 included in the mood message does not relate to a video that has been "blacklisted". A video may be blacklisted if, for example, it is found to infringe copyright or contains offensive material. Referring to FIG. 1, a blacklist advertiser 134 is shown connected to network 106, and connected to the blacklist advertiser is a blacklist database 136. Note that the blacklist database can be a centralised database or a distributed P2P database. If any videos are "blacklisted", then the address (i.e. media URI) of the video is stored in the blacklist DB 136. When a user attempts to access a given media URI, the client first sends a message to the blacklist advertiser 134 containing the media URI. The blacklist advertiser 134 compares the media URI sent by the client with those listed in the blacklist DB 136.

If the media URI matches one listed in the blacklist DB 136, then blacklist advertiser 134 sends a message to the client indicating that the video has been blacklisted. In response to this the client does not display the media, but instead displays a notification of the problem. Conversely, if the media URI 616 is not listed in the blacklist DB 136, then the blacklist advertiser 134 sends a message to indicate to the client that the media can be displayed to the user.

In preferred embodiments, in addition to the video in User A's mood message being played to User B when User B is waiting for User A to answer a call, if User B also has a video mood message, then this video can be displayed to User A as part of the incoming call alert. In other words, if both the users have video mood messages, then the video of User A is displayed to User B, and the video of User B is displayed to User A. This is illustrated with reference to FIG. 15.

Figure 15:
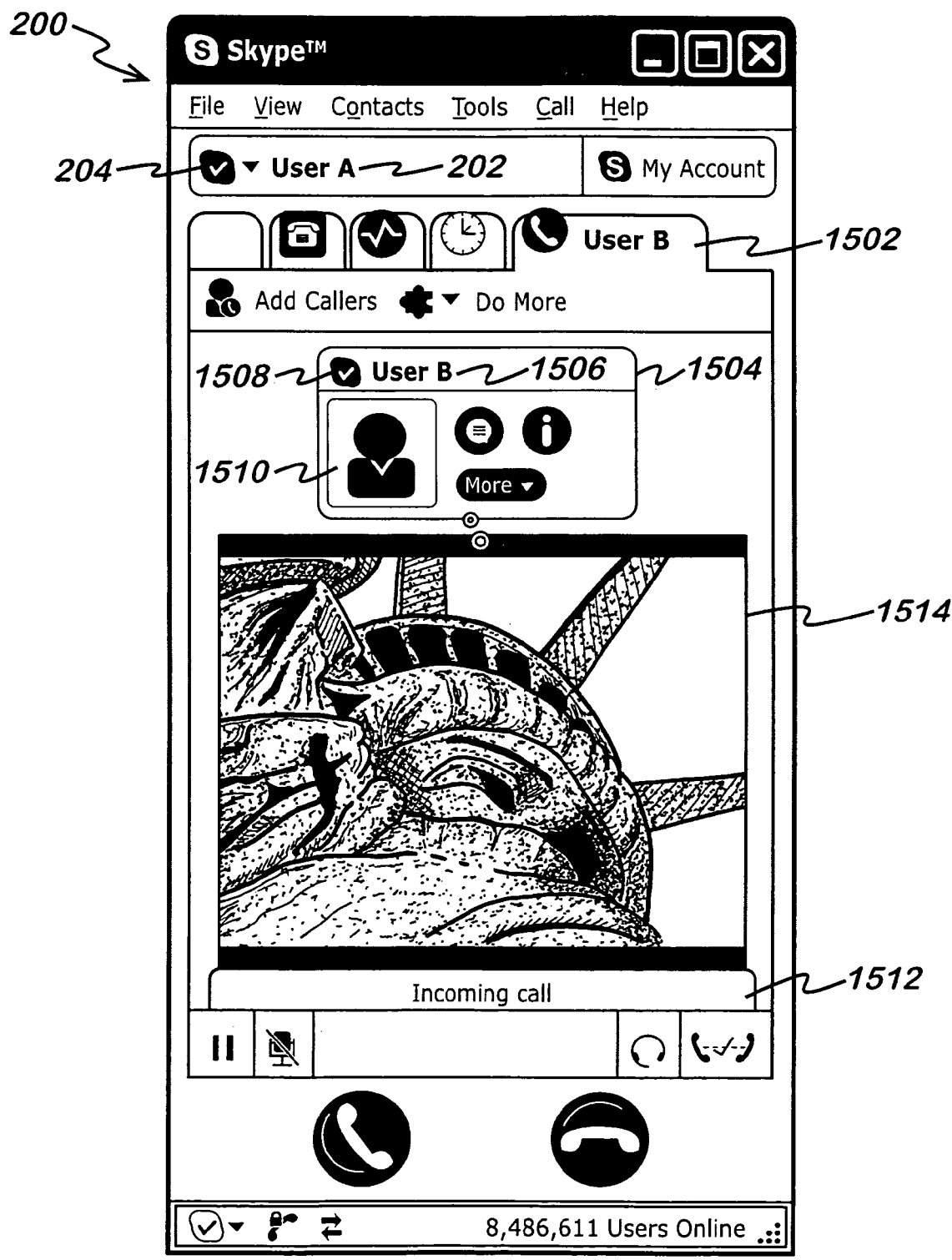
FIG. 15 shows a client user interface displaying a video during an incoming call.

FIG. 15 shows the client UI 200 for User A 102 (as shown in FIG. 2). However, in contrast to FIG. 2, a call is being made from User B 114 to User A 102. This causes a call tab 1502 to be shown (rather than the contacts tab 206 of FIG. 2). The call tab comprises the contact card 1504 of the user calling User A, which displays the callers name 1506, presence state 1510 and avatar 1510. A status field 1512 indicates that this is an incoming call from User B. An embedded video player 1514 displays the video from User B's mood message.

The video in the embedded video player 1514 is displayed by the client 110 using the media URI from User B's mood message to stream the video from the content provider (128, 130, 132), in the same manner as described above with reference to FIGS. 8A to 8D. When User A 102 answers the call, the video displayed to User A in the embedded video player 1514 is muted (in a similar manner to FIG. 8C) but the video continues to play.

User A has the same controls over the video shown when there is an incoming call as described above for User B when placing a call. In particular, the same control bar and menu options are available as described above with reference to FIG. 10A to 10C.

Therefore, the above described system and method ensures that multimedia content shared by users is shown to their contacts in two ways. Firstly, a caller is shown the multimedia content of the called user when he is waiting for the called user to answer the call. Secondly, the called user is shown the multimedia content of the caller when the incoming call is displayed in the client.

While this invention has been particularly shown and described with reference to preferred embodiments, it will be understood to those skilled in the art that various changes in form and detail may be made without departing from the scope of the invention as defined by the appendant claims.

What is claimed is:

1. A method of accessing content at a user terminal connected to a communication network and executing a communication client, comprising:
    said client displaying, in a single user interface, a list of contacts associated with a user of said client;
    said client retrieving a mood message from said communication network, wherein said mood message is created by a further user represented by one of said contacts displayed in said list of contacts, said mood message comprising a uniform resource locator (URL) configured as a reference to video content stored remotely in a storage means accessible by said communication network;
    said client initiating one of a voice or video call to said further user over the communication network responsive to a user of said client selecting said one of said contacts in said list of contacts displayed in the single user interface;
    responsive to initiating said call automatically displaying said video content associated with said further user to said user that initiated the call by automatically browsing to said URL to establish communication with said storage means, accessing the video content stored remotely in the storage means and displaying the video content at said user terminal in the single user interface during a period of time between the call being initiated by said client and the call being answered by said further user; and
    said client muting said video content responsive to said further user answering said call.

2. The method according to claim 1, further comprising downloading the list of contacts from a network element.

3. The method according to claim 1, wherein retrieving the mood message comprises automatically browsing to said URL to establish communication with a further client executed at a user terminal of the further user, the further client comprising said storage means.

4. The method according to claim 1, wherein displaying the video content at said user terminal comprises said client executing media player means at said user terminal, wherein said video content is displayed to said user in the single user interface and using said media player means.

5. The method according to claim 4, wherein said media player means is embedded within said client.

6. The method according to claim 4, wherein said media player means comprises user-operable controls for controlling playback and setting audio properties of said video content.

7. The method according to claim 1, further comprising ascertaining whether said reference to said video content is listed in a database prior to displaying said video content.

8. The method according to claim 7, wherein if said reference to said video content is listed in said database, said user terminal does not display said video content.

9. The method according claim 1, wherein said communication network is a packet based communication network.

10. The method according to claim 1, wherein said client is a voice over internet protocol communication client.

11. The method according to claim 10, wherein said voice over internet protocol communication client is a peer-to-peer communication client.

12. The method according to claim 1, wherein said client is an instant messaging communication client.

13. The method according to claim 1, wherein said user terminal is a personal computer.

14. The method according to claim 1, wherein said user terminal is a mobile device.

15. A user terminal comprising:
    communication means for communicating with a communication network;
    a display; and
    processing means arranged to execute a communication client, wherein said client is configured to:
        display, in a single user interface, a list of contacts associated with a user of said client on said display;
        retrieve a mood message from said communication network, wherein said mood message is related to a further user represented by one of said contacts displayed in said list of contacts displayed in the single user interface, said mood message comprising a network address reference to media content stored in a storage means accessible by said communication network;

initiate one of a voice or video call to said further user over the communication network responsive to a user of said client selecting said one of said contacts in said list of contacts displayed in the single user interface;

responsive to initiating said call automatically displaying said video content associated with said further user to said user that initiated the call by establishing communication with said storage means using said network address reference to automatically navigate to a network location having the media content, access the media content and automatically display the media content on said display and in the single user interface during a period of time between the call being initiated by said client and the call being answered by said further user; and said client muting said media content responsive to said further user answering said call.

16. The user terminal according to claim 15, wherein said media content is a video.

17. The user terminal according to claim 15, wherein said media content is an audio recording.

18. The user terminal according to claim 15, wherein said client is further configured to download the list of contacts from a network element.

19. The user terminal according to claim 15, wherein said client is configured to retrieve the mood message by communicating with a further client executed at a user terminal of the further user.

20. The user terminal according to claim 15, wherein said mood message is created by said further user.

21. The user terminal according to claim 15, wherein said client is further configured to execute media player means at said user terminal, wherein said content is displayed in the single user interface to said user using said media player means.

22. The user terminal according to claim 21, wherein said media player means is embedded within said client.

23. The user terminal according to claim 21, wherein said media player means comprises user-operable controls for controlling playback and setting audio properties of said media content.

24. The user terminal according to claim 15, wherein said client is further configured to ascertain whether said network address reference to said media content is listed in a database prior to displaying said media content.

25. The user terminal according to claim 24, wherein if said network address reference to said media content is listed in said database, said user terminal does not display said media content.

26. The user terminal according to claim 24, wherein said network address reference is a uniform resource identifier.

27. The user terminal according to claim 15, wherein said communication network is a packet based communication network.

28. The user terminal according to claim 15, wherein said client is a voice over internet protocol communication client.

29. The user terminal according to claim 28, wherein said voice over internet protocol communication client is a peer-to-peer communication client.

30. The user terminal according to claim 15, wherein said client is an instant messaging communication client.

31. The user terminal according to claim 15, wherein said user terminal is a personal computer.

32. The user terminal according to claim 15, wherein said user terminal is a mobile device.

33. A method of accessing content at a user terminal connected to a packet based communication network and executing a peer-to-peer voice over internet protocol communication client, comprising:

said client displaying, in a single user interface, a list of contacts associated with a user of said client;

said client retrieving a mood message from said communication network, wherein said message is related to a further user represented by one of said contacts displayed in said list of contacts displayed in the single user interface, said mood message comprising a reference to media content stored remotely in a storage means accessible by said packet based communication network, the reference configured to include at least a media object containing data related to the media content and a text comment having a user input message to accompany the media content;

said client initiating one of a voice or video call to said further user over the packet based communication network responsive to a user of said client selecting said one of said contacts in said list of contacts displayed in the single user interface; and responsive to initiating said call, automatically displaying said media content and said text comment associated with said further user to said user that initiated the call by establishing communication with said storage means using said reference, accessing the media content from the remote storage and automatically displaying, in the single user interface, the media content at said user terminal during a period of time between the call being initiated by said client and the call being answered by said further user, where displaying the media content in the single user interface at said user terminal includes said client executing a media player at said user terminal.

34. A computer program product other than a signal per se comprising a communication client having executable code configured to be executed by a computer processor, the executable code causing the computer processor:

display, in a single user interface, a list of contacts associated with a user;

retrieve a mood message from communication network, wherein said mood message is related to a further user represented by one of said contacts displayed in said list of contacts, said mood message comprising a media object containing data related to media content including a uniform resource identifier (URI) to reference a location of the media content stored in a storage means accessible by said communication network;

initiate one of a voice or video call to said further user over the communication network responsive to a user selecting said one of said contacts in said list of contacts displayed in the single user interface; and ascertain that said URI to reference the location of the media content is not listed in a database comprising blacklisted URIs of blacklisted media content that is not allowed to be displayed;

responsive to the ascertaining that the URI is not listed in the database and the initiation of the one of a voice or video call, automatically displaying said media content associated with said further user to said user that initiated the call, the automatically displaying comprising:
- establish communication with said storage means using said URI from the media object to reference the media content, access the media content and automatically display, in the single user interface, the media content during a period of time between the call being initiated by said client and the call being answered by said further user; and
- execute a media player, wherein the media content is automatically displayed, in the single user interface, to said user using said media player.

35. A user terminal comprising:
A packet based communication network;
a display;
processing means arranged to execute a peer-to-peer instant messaging communication client, wherein said client is configured to:
- display, in a single user interface, a list of contacts associated with a user of said client on said display;
- retrieve a mood message from said packet based communication network, wherein said mood message is related to a further user represented by one of said contacts displayed in said list of contacts displayed in the single user interface, said mood message comprising a reference having a media object containing data related to media content and a text comment having a user input message to accompany the media content, the media object including a network address specifying a location of the media content stored in a storage means accessible by said packet based communication network;
- initiate one of a voice or video call to said further user over the communication network responsive to a user of said client selecting said one of said contacts in said list of contacts displayed in the single user interface; and
- responsive to initiating said call, automatically displaying said media content and said text comment associated with said further user to said user that initiated the call by establishing communication with said storage means using said network address to automatically navigate the communication client to the location of the media content, access the media content and automatically display, in the single user interface, the media content in a media player means on said display during a period of time between the call being initiated by said client and the call being answered by said further user.

* * * * *